(12) United States Patent
Maetaki

(10) Patent No.: US 10,983,315 B2
(45) Date of Patent: Apr. 20, 2021

(54) OPTICAL SYSTEM AND IMAGING APPARATUS

(71) Applicant: CANON KABUSHIKI KAISHA, Tokyo (JP)

(72) Inventor: Satoshi Maetaki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/283,576

(22) Filed: Feb. 22, 2019

(65) Prior Publication Data

US 2019/0265450 A1    Aug. 29, 2019

(30) Foreign Application Priority Data

Feb. 28, 2018 (JP) .............................. JP2018-035316

(51) Int. Cl.
*G02B 15/14* (2006.01)
*G02B 15/20* (2006.01)

(52) U.S. Cl.
CPC .................... *G02B 15/20* (2013.01)

(58) Field of Classification Search
CPC ..................................................... G02B 15/20
USPC ........................................................ 359/676
See application file for complete search history.

(56) References Cited

U.S. PATENT DOCUMENTS

| 6,285,516 B1 * | 9/2001 | Ori ......................... G02B 13/04 359/753 |
| 2008/0192360 A1 | 8/2008 | Chang |
| 2010/0103539 A1 | 4/2010 | Kitahara |
| 2015/0092100 A1 | 4/2015 | Chen |

FOREIGN PATENT DOCUMENTS

| CN | 101510004 A | 8/2009 |
| CN | 102193177 A | 9/2011 |
| CN | 103576301 A | 2/2014 |
| CN | 105074529 A | 11/2015 |
| EP | 2012162 A1 | 1/2009 |
| JP | S61-188511 A | 8/1986 |
| JP | 62-56917 A | 3/1987 |
| JP | H03-141313 A | 6/1991 |
| JP | H09-033800 A | 2/1997 |
| JP | H10-010423 A | 1/1998 |
| JP | H10-020189 A | 1/1998 |
| JP | 2001-281545 A | 10/2001 |
| JP | 2003-043348 A | 2/2003 |
| JP | 2005-024969 A | 1/2005 |
| JP | 2005-266181 A | 9/2005 |
| JP | 2005-283648 A | 10/2005 |

(Continued)

*Primary Examiner* — James C. Jones
(74) *Attorney, Agent, or Firm* — Canon U.S.A., Inc. IP Division

(57) ABSTRACT

An optical system according to the present invention is an optical system consisting of a front lens group having a positive or negative refractive power, an aperture stop, and a rear lens group having a positive or negative refractive power that are placed in order from an object side to an image side. In the optical system, relationships between a distance on an optical axis between a negative lens having the strongest refractive power in the rear lens group and a positive lens placed on the image side of the negative lens, an opening angle of the positive lens, a back focus of the optical system, and a focal length of the optical system are appropriately determined.

21 Claims, 14 Drawing Sheets

(56) References Cited

FOREIGN PATENT DOCUMENTS

| | | |
|---|---|---|
| JP | 2007-192973 A | 8/2007 |
| JP | 2007-212743 A | 8/2007 |
| JP | 2007-292795 A | 11/2007 |
| JP | 2007-328006 A | 12/2007 |
| JP | 2008-129608 A | 6/2008 |
| JP | 2010072377 A | 4/2010 |
| JP | 2010-243637 A | 10/2010 |
| JP | 2010237453 A | 10/2010 |
| JP | 2011-022191 A | 2/2011 |
| JP | 2011-033895 A | 2/2011 |
| JP | 2011-107450 A | 6/2011 |
| JP | 2012-027349 A | 2/2012 |
| JP | 2012-173416 A | 9/2012 |
| JP | 2012-242689 A | 12/2012 |
| JP | 2013-019994 A | 1/2013 |
| JP | 2013-057802 A | 3/2013 |
| JP | 2013-130724 A | 7/2013 |
| JP | 2013-182024 A | 9/2013 |
| JP | 2013-186379 A | 9/2013 |
| JP | 2013-190742 A | 9/2013 |
| JP | 2013-195558 A | 9/2013 |
| JP | 2013-195637 A | 9/2013 |
| JP | 2013-218015 A | 10/2013 |
| JP | 2014-026211 A | 2/2014 |
| JP | 2014-035458 A | 2/2014 |
| JP | 2014-081485 A | 5/2014 |
| JP | 2014-095841 A | 5/2014 |
| JP | 2014-139699 A | 7/2014 |
| JP | 2015-043111 A | 3/2015 |
| JP | 2015-068910 A | 4/2015 |
| JP | 5732176 B2 | 6/2015 |
| JP | 2015-121649 A | 7/2015 |
| JP | 2015-152618 A | 8/2015 |
| JP | 2016-038418 A | 3/2016 |
| JP | 2016-166972 A | 9/2016 |
| JP | 2017-116702 A | 6/2017 |
| JP | 2017-191130 A | 10/2017 |
| WO | 2013-069264 A1 | 5/2013 |
| WO | 2013-099213 A1 | 7/2013 |
| WO | 2013/161995 A1 | 10/2013 |
| WO | 2016/031256 | 3/2016 |

* cited by examiner

OPTICAL SYSTEM AND IMAGING APPARATUS

BACKGROUND OF THE INVENTION

Field of the Invention

The present invention relates to an optical system and an imaging apparatus.

Description of the Related Art

In recent years, as an optical system for use in an imaging apparatus, an optical system that is small and inhibits a decrease in marginal illumination has been required.

Japanese Patent Application Laid-Open No. 62-56917 discusses an optical system including a first lens unit having positive refractive power and a second lens unit having negative refractive power that are placed in order from an object side to an image side. The second lens unit having strong negative refractive power is placed on the image side, thereby bringing the exit pupil close to the image side. This achieves a small optical system.

Japanese Patent Application Laid-Open No. 2007-192973 discusses a telecentric optical system in which a plurality of positive lenses is placed near an image plane, thereby making an incident ray approximately perpendicular to the image plane.

SUMMARY OF THE INVENTION

According to an aspect of the present invention, an optical system consists of a front lens group having a positive or negative refractive power, an aperture stop, and a rear lens group having a positive or negative refractive power that are placed in order from an object side to an image side, wherein the rear lens group includes a negative lens Ln having the strongest refractive power in the rear lens group, and a positive lens Lp placed on the image side of the negative lens Ln and satisfying a conditional expression:

$18 < |\theta p| < 90$ (degrees), where $\theta p$ represents the greater of half opening angles of lens surfaces on the object and image sides of the positive lens Lp, and wherein the optical system satisfies conditional expressions:

$0.20 < |\Delta np/fn| < 1.20$, and $0.25 < sk/f < 1.00$, where $\Delta np$ represents a distance on an optical axis between a lens surface on the image side of the negative lens Ln and the lens surface on the object side of the positive lens Lp, and fn represents a focal length of the negative lens Ln, where, in a case where the optical system is a single-focus lens, sk represents a back focus of the single-focus lens, and f represents a focal length of the single-focus lens, and where, in a case where the optical system is a zoom lens, sk represents a back focus of the zoom lens at a wide-angle end, and f represents a focal length of the zoom lens at the wide-angle end.

According to another aspect of the present invention, an optical system consists of a front lens group having a positive or negative refractive power, an aperture stop, and a rear lens group having a positive or negative refractive power that are placed in order from an object side to an image side, wherein the rear lens group includes a negative lens Ln having the strongest refractive power in the rear lens group, and a positive lens Lp that is among positive lenses placed farther on the image side than the negative lens Ln and satisfies a conditional expression:

$1.40 < \Phi p/\Phi sp < 3.00$, where $\Phi p$ represents an effective diameter of a lens surface on the image side of the positive lens Lp, and $\Phi sp$ represents an aperture diameter of the aperture stop, and wherein the optical system satisfies conditional expressions:

$0.20 < |\Delta np/fn| < 1.20$, $0.25 < sk/f < 1.00$, and $0.50 < Lnsk/Ssk < 1.00$, where $\Delta np$ represents a distance on an optical axis between a lens surface on the image side of the negative lens Ln and a lens surface on the object side of the positive lens Lp, and fn represents a focal length of the negative lens Ln, where, in a case where the optical system is a single-focus lens, sk represents a back focus of the single-focus lens, f represents a focal length of the single-focus lens, Lnsk represents a distance on the optical axis from the lens surface on the image side of the negative lens Ln to an image plane, and Ssk represents a distance on the optical axis from the aperture stop to the image plane, and where, in a case where the optical system is a zoom lens, sk represents a back focus of the zoom lens at a wide-angle end, f represents a focal length of the zoom lens at the wide-angle end, Lnsk represents a distance on the optical axis from the lens surface on the image side of the negative lens Ln to the image plane at the wide-angle end, and Ssk represents a distance on the optical axis from the aperture stop to the image plane at the wide-angle end.

Further features of the present invention will become apparent from the following description of exemplary embodiments with reference to the attached drawings.

DESCRIPTION OF THE EMBODIMENTS

Figure 1:
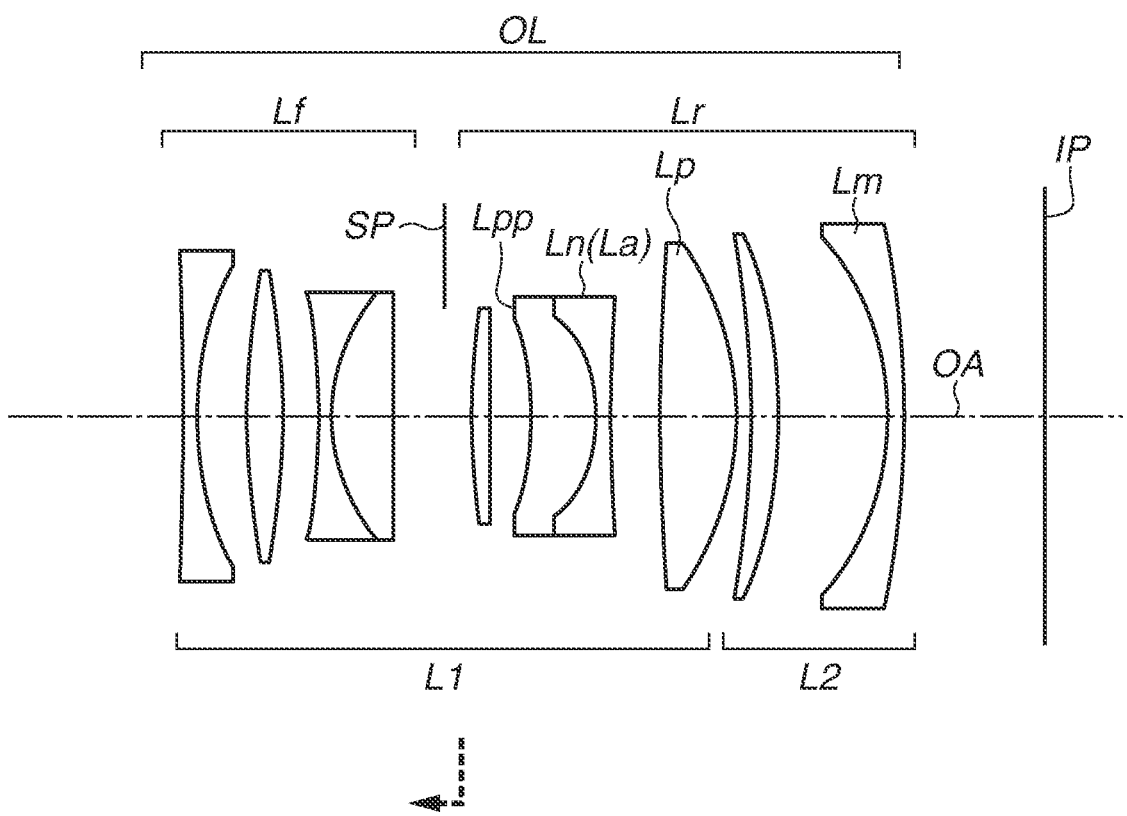
FIG. 1 is a cross-sectional view of an optical system according to a first exemplary embodiment.

Based on the attached drawings, an optical system and an imaging apparatus according to each of the exemplary embodiments of the present invention will be described in detail below. Each of the embodiments of the present invention described below can be implemented solely or as a combination of a plurality of the embodiments or features thereof where necessary or where the combination of elements or features from individual embodiments in a single embodiment is beneficial.

[Exemplary Embodiments of Optical System]

Each of the optical systems according to the exemplary embodiments is an imaging optical system for use in an imaging apparatus such as a video camera, a digital camera, a silver halide film camera, and a television camera. In each of cross-sectional views of the optical systems illustrated in FIGS. 1, 3, 5, 7, 9, and 11, the left-side is an object side (front), and the right-side is an image side (rear). In each of the cross-sectional views, if i represents the order of lens units from the object side to the image side, Li represents an i-th lens unit. An aperture stop SP determines (restricts) a beam having an open F-number (Fno).

In focusing from an object at infinity to an object at the closest distance, the focus lens unit moves as indicated by a dashed arrow in each of FIGS. 3, 5, 7, 9, and 11. In a zoom lens illustrated in FIG. 11, in zooming from a wide-angle end to a telephoto end, lens units move as indicated by solid arrows in FIG. 11. In this specification, a "lens unit" may include a plurality of lenses or may include a single lens.

In a case where the optical system according to each of the exemplary embodiments is used in the imaging apparatus such as a video camera and a digital camera, an image plane IP corresponds to an image sensor (photoelectric conversion element) such as a charge-coupled device (CCD) sensor and a complementary metal-oxide-semiconductor (CMOS) sensor. In a case where the optical system according to each of the exemplary embodiments is used in the imaging apparatus such as a silver halide film camera, the image plane IP corresponds to a film surface.

FIGS. 2, 4, 6, 8, 10, 12A, and 12B are aberration diagrams of the optical systems according to the exemplary embodiments. In each of the spherical aberration diagrams, a solid line represents the d-line (wavelength of 587.6 nm), a two-dot chain line represents the g-line (wavelength of 435.8 nm), a one-dot chain line represents the C-line (wavelength of 656.3 nm), and a dashed line represents the F-line (wavelength of 486.1 nm). In each of the astigmatism diagrams, a dashed line ΔM represents a meridional image plane, and a solid line ΔS represents a sagittal image plane. Each of the distortion diagrams illustrates distortion at the d-line. Magnification chromatic aberration is represented by the g-line, the F-line, and the C-line. Half angle of view (degrees) is represented by ω, and an F-number is represented by Fno.

In the description below, a "single-focus lens" means an optical system having a constant focal length. A "zoom lens" means an optical system having a variable focal length. Further, in the zoom lens, a "wide-angle end" means a zoom position where the focal length of the zoom lens is the shortest, and a "telephoto end" means a zoom position where the focal length of the zoom lens is the longest.

As in the optical systems discussed in the literatures cited as the related art, if a lens unit having strong negative refractive power is placed near an image plane, the maximum angle of incidence of an off-axis beam incident on an image sensor is great, and therefore, marginal illumination decreases. If, on the other hand, many positive lenses are placed adjacent to each other near the image plane in order to guide a ray approximately parallel to the optical axis toward the image plane, the position of an exit pupil is too distant from the image plane, and therefore, an entire length of the optical system is likely to be long.

In response, an optical system according to the present invention employs the following configuration.

The optical system according to the present invention consists of a front lens group having a positive or negative refractive power, an aperture stop, and a rear lens group having a positive or negative refractive power that are placed in order from an object side to an image side. Each of the front and rear lens groups includes a lens. Particularly, the rear lens group includes a positive lens Lp and a negative lens Ln.

The negative lens Ln is a lens having the strongest refractive power among negative lenses included in the rear lens group. The positive lens Lp is a positive lens placed on the image side of the negative lens Ln and satisfying a conditional expression below:

$$18 < |\theta p| < 90 \text{ (degrees)} \quad (1),$$

where θp represents the greater of the half opening angles of lens surfaces on the object and image sides of the positive lens Lp.

Figure 14:
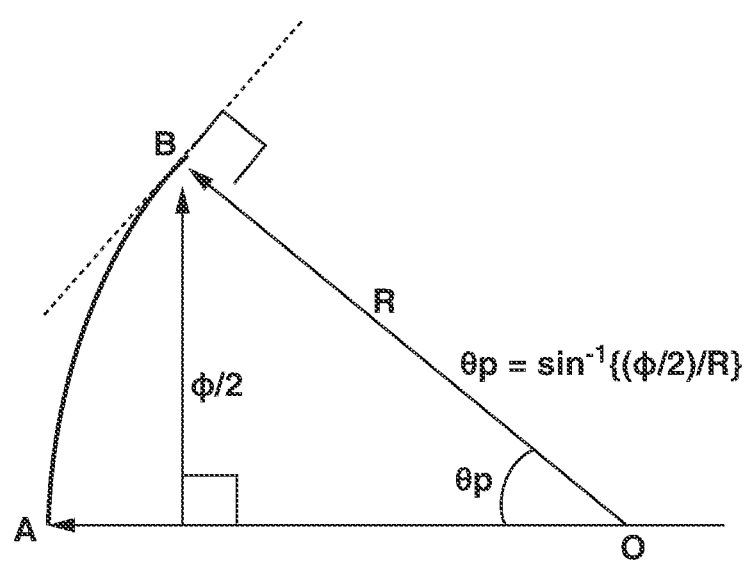
FIG. 14 is a diagram illustrating an opening angle.

With reference to FIG. 14, the definition of the half opening angle θp is described. The half opening angle θp is calculated by:

$$\theta p = \angle BOA = \sin^{-1}\{(\Phi/2)/R\},$$

where an origin O is an intersection of a straight line that passes through a surface vertex A of a lens having an effective diameter Φ and is parallel to the optical axis, and a normal line of a tangent line passing through a position B on a lens surface of the lens having the effective diameter Φ and where the length of a straight line OB is the radius of curvature R.

In the present specification, however, the effective diameter of a lens is the diameter of a circle of which the radius equals the height, from the optical axis, of a ray passing through a position most distant from the optical axis from among rays passing through a lens surface of the lens.

The optical system according to each of the exemplary embodiments satisfies conditional expressions (2) and (3) below.

$$0.20 < |\Delta np/fn| < 1.20 \quad (2)$$

$$0.25 < sk/f < 1.00 \quad (3)$$

A distance on the optical axis between a lens surface on the image side of the negative lens Ln and the lens surface on the object side of the positive lens Lp is Δnp. A sign of Δnp is positive in a case where the negative lens Ln is located on the object side of the positive lens Lp and is negative in a case where the negative lens Ln is located on the image side of the positive lens Lp. A focal length of the negative lens Ln is fn. An air-converted distance on the optical axis (hereinafter referred to as a "back focus") from a lens surface furthest on the image side of the optical system to the image plane IP is Sk. However, in a case where the optical system is a zoom lens, the back focus of the zoom lens at the wide-angle end is sk. A focal length of the entire optical system is f. However, in a case where the optical system is a zoom lens, the focal length of the zoom lens at the wide-angle end is f.

A ray incident on the image plane at the maximum angle of incidence is a ray forming an off-axis beam. Thus, to reduce the maximum angle of incidence of the ray on the image plane in order to suppress a decrease in the marginal illumination, it is necessary to reduce the angle of incidence of mainly the off-axis beam.

In response, in each of the exemplary embodiments, the refractive power and the placement of the negative lens Ln and the positive lens Lp are important. The negative lens Ln having strong negative refractive power is placed further on the image side than the aperture stop, thereby separating an on-axis beam from an off-axis beam in a direction perpendicular to the optical axis (hereinafter referred to as a radial direction). Further, the positive lens Lp having relatively strong positive refractive power is placed on the image side of the negative lens Ln, thereby adequately refracting the off-axis beam among the beams separated by the negative lens Ln. This reduces the angle of incidence of the off-axis beam.

Particularly, it is desirable that the positive lens Lp be placed at a position that is on the image side of the negative lens Ln and is where the on-axis beam and the off-axis beam are largely separated from each other in the radial direction. Then, the absolute value of the half opening angle of the positive lens Lp is made relatively great, whereby it is possible to strongly refract the off-axis beam passing through the positive lens Lp.

Further, based on the placement of the negative lens Ln, an effect of shortening a distance from the image plane to the exit pupil (hereinafter referred to as an "exit pupil distance") is obtained, thereby achieving a small optical system.

Next, each of conditional expressions (1) to (3) is described.

Conditional expression (1) is related to the absolute value of the half opening angle of the positive lens Lp. Generally, in a case where positive lenses of spherical shapes having equal focal lengths and different half opening angles are compared, the lens having a smaller radius of curvature, i.e., the lens having the larger absolute value of the half opening angle, can refract a ray that passes through a portion close to the outer periphery of the lens more strongly. If |θp| falls below the lower limit of conditional expression (1), the force to refract particularly the off-axis beam in the ray that passes through the positive lens Lp becomes weak. Consequently, it is difficult to inhibit the decrease in the marginal illumination, which is not desirable. It is physically impossible to obtain a positive lens Lp that exceeds an upper limit of conditional expression (1).

Conditional expression (2) is related to the distance between the negative lens Ln and the positive lens Lp, and the refractive power of the negative lens Ln. If |Δnp/fn| falls below a lower limit of conditional expression (2), i.e., the refractive power of the negative lens Ln is too weak for Δnp, the exit pupil distance is long, and therefore, the entire length of the optical system is long, which is not desirable. If |Δnp/fn| exceeds an upper limit of conditional expression (2), i.e., the refractive power of the negative lens Ln is too strong for Δnp, a force to separate the on-axis beam and the off-axis beam from each other in the radial direction is too strong. This makes the maximum angle of incidence of the ray on the image plane large. Thus, it is difficult to inhibit the decrease in the marginal illumination, which is not desirable.

Conditional expression (3) is related to a ratio between the focal length and the back focus of the optical system, and particularly contributes to downsizing of the optical system. If sk/f falls below a lower limit of conditional expression (3) and the back focus is short relative to the focal length, a lens including a lens surface having a large effective diameter is placed further on the image side than the aperture stop. This makes the optical system large in the radial direction, which is not desirable. If sk/f exceeds the upper limit of conditional expression (3), and the back focus is long relative to the focal length, the entire length of the optical system is long, which is not desirable.

It is desirable to set the numerical ranges of conditional expressions (1) to (3) as follows.

$$19 < |\theta p| < 50 \text{ (degrees)} \tag{1a}$$

$$0.22 < |\Delta np/fn| < 0.90 \tag{2a}$$

$$0.20 < sk/f < 0.80 \tag{3a}$$

It is more desirable to set the numerical ranges of conditional expressions (1) to (3) as follows.

$$18 < |\theta p| < 45 \text{ (degrees)} \tag{1b}$$

$$0.24 < |\Delta np/fn| < 0.85 \tag{2b}$$

$$0.25 < sk/f < 0.70 \tag{3b}$$

The above configuration and conditional expressions are satisfied, whereby it is possible to achieve the optical system that is small and inhibits the decrease in the marginal illumination. Further, for example, in a case where an interchangeable lens including this optical system is attached to an imaging apparatus, it is possible to reduce occurrence of shading.

It is further desirable that the optical system according to each of the exemplary embodiments satisfy at least one of the following conditional expressions (4) to (19).

$$0.70 < \Phi p/\Phi r \le 1.00 \tag{4}$$

$$1.00 < fp/fpp < 6.00 \tag{5}$$

$$1.00 < \Phi p/\Phi pp < 4.00 \tag{6}$$

$$1.00 < \Phi p/\Phi a < 4.00 \tag{7}$$

$$1.00 < (h\hat{\ }p/hp)/(h\hat{\ }a/ha) < 5.00 \tag{8}$$

$$0.20 < \Phi p/Tk < 1.00 \tag{9}$$

$$1.00 < Tk/f < 5.00 \tag{10}$$

$$0.30 < fp/f < 5.00 \tag{11}$$

$$-6.00 < fp/fn < -0.70 \tag{12}$$

$$0.50 < \Phi p/\Phi i < 1.00 \tag{13}$$

$$2.00 < |fr/fn| < 10.00 \tag{14}$$

$$0.00 < |\Delta np|/Ssk < 0.80 \tag{15}$$

$$0.50 < Lnsk/Ssk < 1.00 \tag{16}$$

$$0.00 < |\Delta ppp|/Ssk < 1.00 \tag{17}$$

$$-0.20 < \Delta ppn/Ssk < 0.20 \tag{18}$$

$$0.20 < |(R2+R1)/(R2-R1)| < 1.00 \tag{19}$$

The symbols are defined as follows.

The effective diameter of the lens surface on the image side of the positive lens Lp is Φp, and the maximum effective diameter of a lens having the maximum effective diameter among lenses included in the rear lens group is Φr. The effective diameter Φp of the lens surface on the image side of the positive lens Lp can be equal to the maximum effective diameter Φr (Φp=Φr). The focal length of the positive lens Lp is fp.

When a positive lens included in the rear lens group and having the strongest refractive power among positive lenses placed on the object side of the positive lens Lp is referred to as a positive lens Lpp, a focal length of the positive lens Lpp is fpp, and an effective diameter of the lens surface on the image side of the positive lens Lpp is Φpp.

When a lens placed adjacent to the positive lens Lp on the object side is referred to as a lens La, an effective diameter of a lens surface on the image side of the lens La is Φa. However, "placed adjacent to" also includes a case where the lens La is placed adjacent to the positive lens Lp with an air layer interposed between them. The lens La can be a positive lens or a negative lens. Further, the lens La can be the positive lens Lpp or the negative lens Ln.

On the lens surface on the image side of the positive lens Lp, a height of a principal ray of the off-axis beam passing through the positive lens Lp is h^p, and a height of the peripheral ray of the on-axis beam passing through the positive lens Lp is hp. On the lens surface on the image side of the lens La, a height of the principal ray of the off-axis beam passing through the lens La is h^a, and a height of the peripheral ray of the on-axis beam passing through the lens La is ha.

The exit pupil distance of the optical system is Tk, the diameter of the image circle of the optical system is Φi, the focal length of the rear lens group is fr, the distance on the optical axis from the aperture stop to the image plane is Ssk, and the distance on the optical axis from the lens surface on the image side of the negative lens Ln to the image plane is Lnsk. A distance on the optical axis from the lens surface on the image side of the positive lens Lpp to the lens surface on the object side of the positive lens Lp is Δppp, and a distance on the optical axis from the lens surface on the image side of the positive lens Lpp to a lens surface on the object side of the negative lens Ln is Δppn.

In a case where the positive lens Lp is a single lens (i. e., the positive lens Lp is not a component of a cemented lens), the radii of curvature of the lens surfaces on the object and image sides of the positive lens Lp are R1 and R2, respectively. In a case where the positive lens Lp is a component of a cemented lens, the radii of curvature of lens surfaces on the object and image sides of the cemented lens are R1 and R2, respectively.

However, in a case where the optical system is a zoom lens, the exit pupil distance Tk, the image circle Φi, the focal length fr, the distance Ssk, the distance Lnsk, the distance Δppp, and the distance Δppn are values at the wide-angle end of the zoom lens. Further, the sign of Δppp is positive in a case where the positive lens Lpp is located on the object side of the positive lens Lp, and is negative in a case where the positive lens Lpp is located on the image side of the positive lens Lp. The sign of Δppn is positive in a case where the positive lens Lpp is located on the object side of the negative lens Ln, and is negative in a case where the lens Lpp is located on the image side of the negative lens Ln.

Conditional expression (4) represents that the positive lens Lp is a lens having the maximum effective diameter, or the positive lens Lp is placed at a position relatively close to the lens having the maximum effective diameter. More specifically, conditional expression (4) indicates that the positive lens Lp is placed near the image plane where the lens having the maximum effective diameter is often placed. If Φp/Φr falls below a lower limit of conditional expression (4) and the effective diameter of the positive lens Lp is small, the exit pupil distance is long, and therefore, the entire length of the optical system is long, which is not desirable. Further, it is impossible for the effective diameter of the positive lens Lp to exceed an upper limit of conditional expression (4).

Conditional expression (5) is related to a ratio between the focal lengths of the positive lens Lp and the positive lens Lpp. If fp/fpp falls below a lower limit of conditional expression (5) and the refractive power of the positive lens Lp is strong, it is difficult to correct aberration caused by the off-axis beam. Further, the maximum angle of incidence of the ray on the image plane is too small, and therefore, the entire length of the optical system is long, which is not desirable. If fp/fpp exceeds an upper limit of conditional expression (5), and the refractive power of the positive lens Lp is weak, the force to refract the off-axis beam is weak. This makes the maximum angle of incidence of the ray on the image plane large. Thus, it is difficult to inhibit the decrease in the marginal illumination, which is not desirable.

Conditional expression (6) is related to the ratio between the effective diameter of the positive lens Lp and the effective diameter of the positive lens Lpp. If Φp/Φpp falls below a lower limit of conditional expression (6), it is difficult for the positive lens Lp to refract the off-axis beam. Thus, the off-axis beam is gradually refracted when passing through the positive lens Lpp and the positive lens Lp. This makes the maximum angle of incidence on the image plane large. Thus, it is difficult to inhibit the decrease in the marginal illumination, which is not desirable. If Φp/Φpp exceeds an upper limit of conditional expression (6), the height at which the off-axis beam passes greatly changes further on the image side than the aperture stop. This makes the maximum angle of incidence of the ray on the image plane large. Thus, it is difficult to inhibit the decrease in the marginal illumination, which is not desirable.

Conditional expression (7) is related to a ratio between the effective diameter of the positive lens Lp and the effective diameter of the lens La placed adjacent to the positive lens Lp on the object side. If Φp/Φa falls below a lower limit of conditional expression (7), the effective diameter of the positive lens Lp is smaller than that of the lens La. In such a case, it is difficult for the positive lens Lp to make its refractive action on the off-axis beam greater than its refractive action on the on-axis beam, which is not desirable. Thus, it is difficult for the positive lens Lp to refract the off-axis beam. This makes the maximum angle of incidence on the image plane large, which is not desirable. If Φp/Φa exceeds an upper limit of conditional expression (7), a height at which the off-axis beam passes greatly changes further on the image side than the aperture stop. This makes the maximum angle of incidence of the ray on the image plane large. Thus, it is difficult to inhibit the decrease in the marginal illumination, which is not desirable.

Conditional expression (8) is related to a ratio between the heights of the off-axis beam and the on-axis beam passing through the positive lens Lp, and a ratio between the heights of the off-axis beam and the on-axis beam passing through the lens La. More specifically, conditional expression (8) represents the ratio between the degrees of separation of the beams on the positive lens Lp and the lens La. If (h^p/hp)/(h^a/ha) falls below a lower limit of conditional expression (8) and the degree of separation of the beams on the positive lens Lp is small, it is difficult for the positive lens Lp to strongly refract the off-axis beam, which is not desirable. If (h^p/hp)/(h^a/ha) exceeds an upper limit of conditional expression (8) and the degree of separation of the beams on the positive lens Lp is great, the height at which the off-axis beam passes becomes great in a direction in which the angle of incidence on the image plane increases. This makes the maximum angle of incidence of the ray on the image plane large. Thus, it is difficult to inhibit the decrease in the marginal illumination, which is not desirable.

Conditional expression (9) is related to a ratio between the effective diameter of the positive lens Lp and the exit pupil distance of the optical system. If Φp/Tk falls below a lower limit of conditional expression (9) and the effective diameter of the positive lens Lp relative to the exit pupil distance is small, an incidence height of the off-axis beam incident on the positive lens Lp becomes small. Then, a refractive action on the off-axis beam decreases for this. This makes the maximum angle of incidence of the ray on the image plane large. Thus, it is difficult to inhibit the decrease in the marginal illumination, which is not desirable. If Φp/Tk exceeds an upper limit of conditional expression (9) and the effective diameter of the positive lens Lp relative to the exit pupil distance is large, the optical system comes close to a telecentric optical system on the image side, and therefore, the entire length of the optical system is long, which is not desirable.

Conditional expression (10) is related to a ratio between the focal length and the exit pupil distance of the optical system. If Tk/f falls below a lower limit of conditional expression (10) and the focal length is long, a refractive action on the off-axis beam is small. This makes the maximum angle of incidence of the ray on the image plane large. Thus, it is difficult to inhibit the decrease in the marginal illumination, which is not desirable. If Tk/f exceeds an upper limit of conditional expression (10) and the exit pupil distance is long, the entire length of the optical system is long, which is not desirable.

Conditional expression (11) is related to the focal length of the positive lens Lp and the focal length of the entire optical system. If fp/f falls below a lower limit of conditional expression (11), and the focal length of the positive lens Lp is short, i.e., the refractive power of the positive lens Lp is strong, a distance from the image plane to the exit pupil is long, and therefore, the entire length of the optical system is long. This makes the optical system large, which is not desirable. Further, the strong refractive action of the positive lens Lp increases various types of aberration, which is not desirable. If fp/f exceeds an upper limit of conditional expression (11) and the focal length of the positive lens Lp is long, i.e., the refractive power of the positive lens Lp is weak, the refractive action on the off-axis beam passing through the positive lens Lp is small. This makes the maximum angle of incidence of the ray on the image plane large. Thus, it is difficult to inhibit the decrease in the marginal illumination, which is not desirable.

Conditional expression (12) is related to a ratio between the focal length of the positive lens Lp to the focal length of the negative lens Ln. If fp/fn falls below a lower limit of conditional expression (12) and the refractive power of the positive lens Lp is weak, the angle of incidence of the off-axis beam on the image plane is large. Thus, it is difficult to inhibit the decrease in the marginal illumination, which is not desirable. If fp/fn exceeds an upper limit of conditional expression (12) and the refractive power of the positive lens Lp is strong, the angle of incidence on the image plane is too small, and therefore, the entire length of the optical system is long, which is not desirable.

Conditional expression (13) is related to a ratio between the effective diameter of the positive lens Lp and a diameter of an image circle of the optical system. If Φp/Φi falls below a lower limit of conditional expression (13) and the effective diameter of the positive lens Lp relative to the image circle is small, the refractive action of the positive lens Lp on the off-axis beam is small. Thus, it is difficult to make the angle of incidence on the image plane small, which is not desirable. If Φp/Φi exceeds an upper limit of conditional expression (13) and the effective diameter of the positive lens Lp relative to the diameter of the image circle is large, the diameter of the positive lens Lp is large, and therefore, the optical system is large in the radial direction, which is not desirable.

Conditional expression (14) is related to a ratio between the combined focal length of the rear lens group to the focal length of the negative lens Ln. If |fr/fn| falls below a lower limit of conditional expression (14), the refractive power of the negative lens Ln is weak. This makes the exit pupil distance long, and therefore, the entire length of the optical system is long, which is not desirable. If |fr/fn| exceeds an upper limit of conditional expression (14), the refractive power of the negative lens Ln is strong. This makes the force to separate the on-axis beam and the off-axis beam excessively great. Thus, a height at which the off-axis beam passes through the positive lens Lp is great, and therefore, the maximum angle of incidence on the image plane is great, which is not desirable.

Conditional expression (15) is related to a ratio between the distance between the positive lens Lp and the negative lens Ln, and a distance from the aperture stop to the image plane. If |Δnp|/Ssk falls below a lower limit of conditional expression (15), the distance between the positive lens Lp and the negative lens Ln is too short, and therefore, the force to separate the on-axis beam from the off-axis beam is weak. Consequently, the height at which the off-axis beam passes through the positive lens Lp is too small. Thus, to maintain the maximum angle of incidence on the image plane within an acceptable range, the entire length of the optical system is long, which is not desirable. If |Δnp|/Ssk exceeds an upper limit of conditional expression (15), the distance between the positive lens Lp and the negative lens Ln is long, and therefore, the force to separate the on-axis beam from the off-axis beam is strong. This makes the maximum angle of incidence on the image plane large. Thus, it is difficult to inhibit the decrease in the marginal illumination, which is not desirable.

Conditional expression (16) is related to placement of the negative lens Ln. If Lnsk/Ssk falls below a lower limit of conditional expression (16) and the negative lens Ln is placed relatively close to the image side, the exit pupil distance is long, and therefore, the entire length is long, which is not desirable. If Lnsk/Ssk exceeds an upper limit of conditional expression (16) and the negative lens Ln is placed relatively close to the object side, the maximum angle of incidence on the image plane is large, which is not desirable.

Conditional expression (17) is related to a distance between the positive lens Lpp and the positive lens Lp. If |Δppp|/Ssk falls below a lower limit of conditional expression (17), it is difficult to secure a difference between the diameters of the positive lens Lpp and the positive lens Lp. Consequently, the off-axis beam is gradually refracted toward the image plane. Thus, it is difficult to reduce the maximum angle of incidence on the image plane, which is not desirable. It is physically impossible that $|\Delta ppp|/Ssk$ exceeds an upper limit of conditional expression (17). The closer to 1.00 a value of conditional expression (17) is, the larger the diameter of the positive lens Lp becomes. This makes the optical system large in the radial direction, which is not desirable.

Conditional expression (18) is related to a distance between the positive lens Lpp and the negative lens Ln. The positive lens Lpp can be placed further on the object side than the negative lens Ln, or the positive lens Lpp can be placed further on the image side than the negative lens Ln. If $\Delta ppn/Ssk$ falls below a lower limit of conditional expression (18) and the negative lens Ln is placed further on the object side than the positive lens Lpp, the entire length of the optical system is long, which is not desirable. Further, if $\Delta ppn/Ssk$ exceeds an upper limit of conditional expression (18) and the positive lens Lpp is placed further on the object side than the negative lens Ln, the entire length of the optical system is short, but the maximum angle of incidence on the image plane is large, which is not desirable.

In a case where the positive lens Lp is a single lens, conditional expression (19) is related to a shape factor of the positive lens Lp. In a case where the positive lens Lp is a component of a cemented lens, conditional expression (19) is related to a shape factor of the cemented lens. It is desirable that the positive lens Lp be a lens having convex shapes on both sides thereof so that the off-axis beam can be largely refracted. Further, it is desirable that the radius of curvature of one of lens surfaces of the positive lens Lp is larger than that of the other so as to largely refract the off-axis beam while reducing occurrence of aberration. Consequently, it is possible to reduce the occurrence of aberration while making the refractive action greater near the outline of the lens, which mainly refracts the off-axis beam, than near the center of the lens.

Conditional expression (19) is determined from this point of view. If $|(R2+R1)/(R2-R1)|$ falls below the lower limit of conditional expression (19), and the radius of curvature of the lens surface on the image side is close to the radius of curvature of the lens surface on the object side, a refractive power per lens surface is weak. Consequently, the refractive action on the off-axis beam is dispersed, and therefore, it is difficult to reduce the maximum angle of incidence of the ray on the image plane. Thus, it is difficult to inhibit a decrease in the marginal illumination, which is not desirable. If $|(R2+R1)/(R2-R1)|$ exceeds the upper limit of conditional expression (19), i.e., the positive lens Lp has a meniscus shape, the refractive power of the positive lens Lp is small, which is not desirable.

Other exemplary embodiments of the optical system are described. It is desirable that the lens La include a concave lens surface facing the image side. Consequently, it is possible to make the ray incident on the positive lens Lp in the state where the on-axis beam and the off-axis beam are largely separated from each other in the radial direction. Thus, the positive lens Lp can refract the off-axis beam more strongly than the on-axis beam. Thus, it is possible to reduce the maximum angle of incidence of the ray on the image plane.

It is desirable that the radius of curvature of the lens surface on the image side of the positive lens Lp (or the cemented lens including the positive lens Lp) be smaller than the radius of curvature of the lens surface on the object side of the positive lens Lp (or the cemented lens including the positive lens Lp). The angle of incidence on the positive lens Lp (or the cemented lens including the positive lens Lp) is made relatively small, whereby it is possible to reduce aberration caused by the off-axis beam.

In a case where the optical system is a zoom lens, it is desirable that an incidence height of the off-axis beam passing through the positive lens Lp at a wide-angle end of the optical system be greater than an incidence height of the off-axis beam passing through the positive lens Lp at a telephoto end of the optical system. Consequently, at the wide-angle end where the maximum angle of incidence of the ray on the image plane is more likely to be large, an effect of reducing the angle of incidence of the ray on the image plane is larger. Thus, it is possible to reduce fluctuations in the maximum angle of incidence in the entire zoom area.

It is desirable to set the numerical ranges of conditional expressions (4) to (19) as follows.

$0.77 < \Phi p/\Phi r \leq 1.00$ (4a)

$1.10 < fp/fpp < 5.00$ (5a)

$1.20 < \Phi p/\Phi pp < 3.00$ (6a)

$1.20 < \Phi p/\Phi a < 3.00$ (7a)

$1.20 < (h\hat{}p/hp)/(h\hat{}a/ha) < 4.00$ (8a)

$0.40 < \Phi p/Tk < 0.90$ (9a)

$1.00 < Tk/f < 4.00$ (10a)

$0.40 < fp/f < 4.00$ (11a)

$-5.00 < fp/fn < -0.80$ (12a)

$0.55 < \Phi p/\Phi i < 0.90$ (13a)

$2.10 < |fr/fn| < 7.50$ (14a)

$0.03 < |\Delta np|/Ssk < 0.60$ (15a)

$0.55 < Lnsk/Ssk < 0.90$ (16a)

$0.00 < |\Delta ppp|/Ssk < 0.50$ (17a)

$-0.10 < \Delta ppn/Ssk < 0.15$ (18a)

$0.35 < |(R2+R1)/(R2-R1)| < 1.00$ (19a)

It is more desirable to set the numerical ranges of conditional expressions (4) to (19) as follows.

$0.84 < \Phi p/\Phi r \leq 1.00$ (4b)

$1.15 < fp/fpp < 4.75$ (5b)

$1.30 < \Phi p/\Phi pp < 2.50$ (6b)

$1.30 < \Phi p/\Phi a < 2.50$ (7b)

$1.30 < (h\hat{}p/hp)/(h\hat{}a/ha) < 3.50$ (8b)

$0.50 < \Phi p/Tk < 0.80$ (9b)

$1.00 < Tk/f < 3.50$ (10b)

$0.50 < fp/f < 3.00$ (11b)

$-4.50 < fp/fn < -0.90$ (12b)

$0.60 < \Phi p/\Phi i < 0.85$ (13b)

$2.20 < |fr/fn| < 6.30$ (14b)

$$0.05 < |\Delta np|/Ssk < 0.40 \qquad (15b)$$

$$0.60 < Lnsk/Ssk < 0.80 \qquad (16b)$$

$$0.00 < |\Delta ppp|/Ssk < 0.35 \qquad (17b)$$

$$-0.05 < \Delta ppn/Ssk < 0.12 \qquad (18b)$$

$$0.45 < |(R2+R1)/(R2-R1)| < 1.00 \qquad (19b)$$

The optical system according to the present invention can also be represented using the following conditional expressions instead of conditional expressions (1) to (3).

$$1.40 < \Phi p/\Phi sp < 3.00 \qquad (20)$$

$$0.20 < |\Delta np/fn| < 1.20 \qquad (2)$$

$$0.25 < sk/f < 1.00 \qquad (3)$$

$$0.00 < |\Delta ppp|/Ssk < 1.00 \qquad (17)$$

An aperture diameter of the aperture stop is $\Phi sp$, and the other symbols have meanings similar to those above.

A positive lens satisfying conditional expression (20) has a function similar to that of the positive lens Lp. More specifically, while there are the on-axis beam and the off-axis beam separated from each other in the radial direction by the negative lens Ln, mainly the off-axis beam is strongly refracted, thereby reducing the maximum angle of incidence on the image plane.

The further away from the aperture stop the light beam is, the larger the light beam diameter of the light beam having passed through the aperture stop becomes. More specifically, conditional expression (20) indirectly means that the positive lens is placed at a position somewhat away from the stop.

If $\Phi p/\Phi sp$ falls below the lower limit of conditional expression (20), i.e., the positive lens is placed at a position close to the aperture stop, the diameter of the positive lens Lp is small, and therefore, a difference between the refractive actions on the on-axis beam and the off-axis beam is small. Thus, it is difficult to reduce the maximum angle of incidence of the ray on the image plane, which is not desirable. If $\Phi p/\Phi sp$ exceeds the upper limit of conditional expression (20), the diameter of the positive lens Lp is large. Thus, the height at which the off-axis beam passes through the positive lens Lp is great. This makes the maximum angle of incidence of the ray on the image plane large, which is not desirable.

It is more desirable that conditional expression (20) satisfy the following conditional expression.

$$1.45 < \Phi p/\Phi sp < 2.60 \qquad (20a)$$

It is even more desirable that conditional expression (20) satisfy the following conditional expression.

$$1.50 < \Phi p/\Phi sp < 2.40 \qquad (20b)$$

The desirable numerical ranges of conditional expressions (2), (3), and (17) are as described above.

It is more desirable that the optical system satisfying conditional expressions (2), (3), (17), and (20) satisfy at least one of the other conditional expressions described above.

Figure 2:
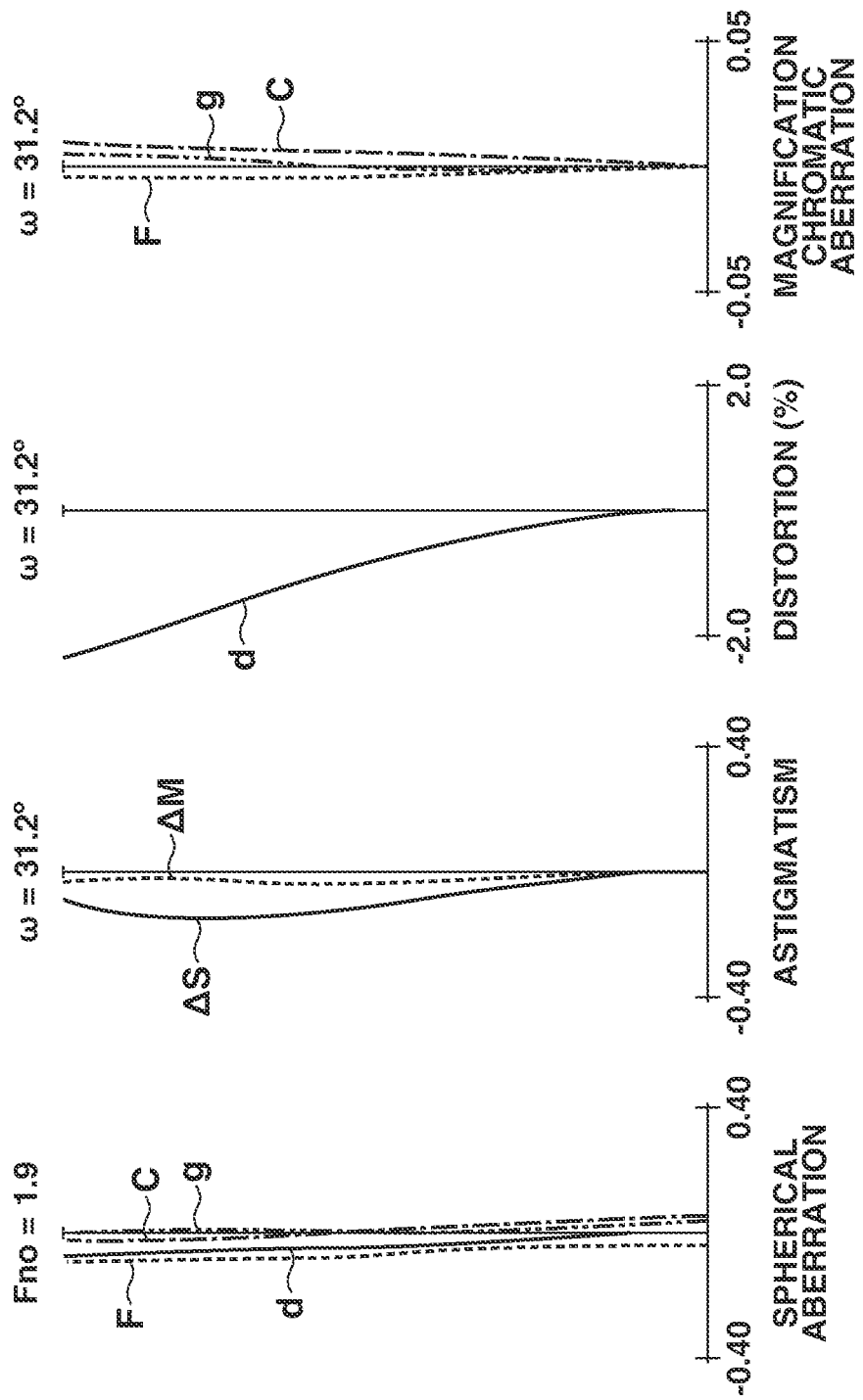
FIG. 2 is aberration diagrams of the optical system according to the first exemplary embodiment.

FIG. 1 is a cross-sectional view of an optical system OL according to a first exemplary embodiment. FIG. 2 is aberration diagrams of the optical system OL when focusing on an object at infinity. The optical system OL according to the first exemplary embodiment is a single-focus lens having a focal length of 35.7 mm and an F-number of 1.85.

The optical system OL consists of a front lens group Lf, an aperture stop SP, and a rear lens group Lr that are placed in order from an object side to an image side. The optical system OL consists of a first lens unit L1 having a positive refractive power and a second lens unit L2 having a negative refractive power that are placed in order from the object side to the image side. The first lens unit L1 consists of eight lenses and the aperture stop SP, and the aperture stop SP is placed between two of the lenses included in the first lens unit L1. In focusing from an infinite distance to a closest distance, the first lens unit L1 moves to the object side, and the second lens unit L2 does not move, whereby a space between the first lens unit L1 and the second lens unit L2 changes.

A positive lens Lp is the eighth lens from the object side of the optical system OL and has a focal length of 31.56 mm, a half opening angle of 33.02 degrees, and an effective diameter of 31.16 mm A radius of curvature of a lens surface on the image side of the positive lens Lp is configured to be smaller than a radius of curvature of a lens surface on the object side of the positive lens Lp.

A negative lens Ln is the seventh lens from the object side of the optical system OL and is also a lens La placed adjacent to the positive lens Lp on the object side. The negative lens Ln includes a concave lens surface facing the image side.

A positive lens Lpp is placed on the object side of the negative lens Ln, and the positive lens Lpp and the negative lens Ln form a cemented lens. A lens Lm having the maximum effective diameter among lenses included in the rear lens group Lr is placed farthest on the image side of the optical system OL.

With these components, as illustrated in the aberration diagrams in FIG. 2, it is possible to excellently correct various types of aberration while reducing the maximum angle of incidence of a ray on an image plane to 26°. Thus, it is possible to obtain an optical system that is small and inhibits a decrease in marginal illumination.

Figure 3:
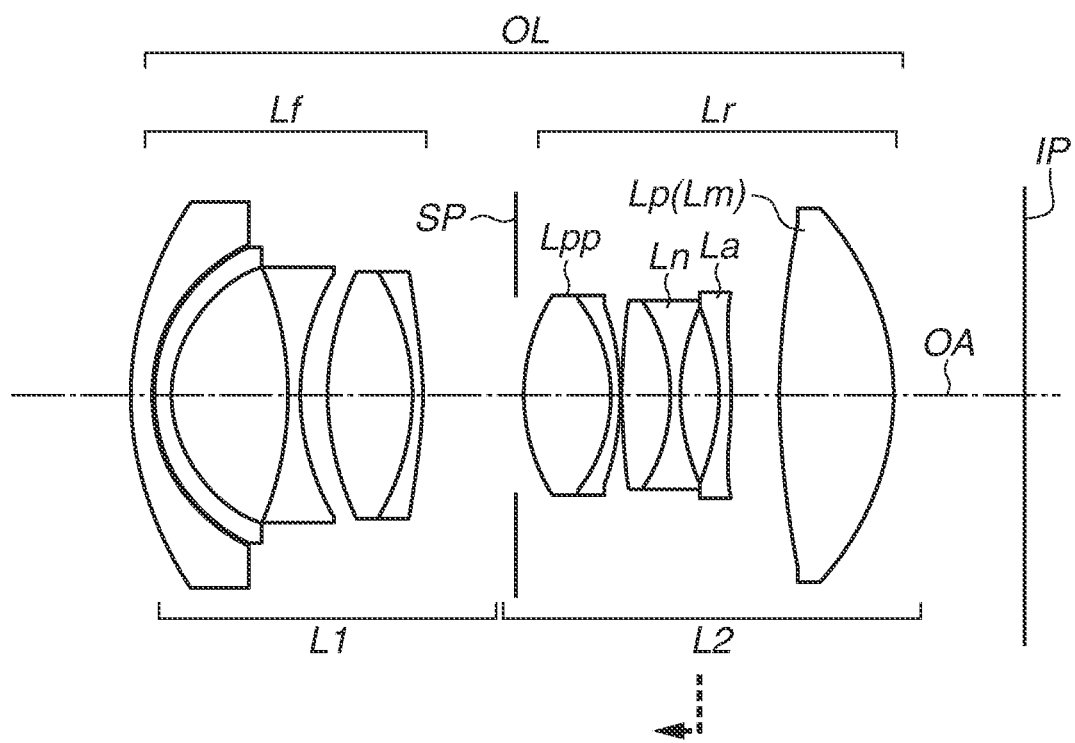
FIG. 3 is a cross-sectional view of an optical system according to a second exemplary embodiment.
Figure 4:
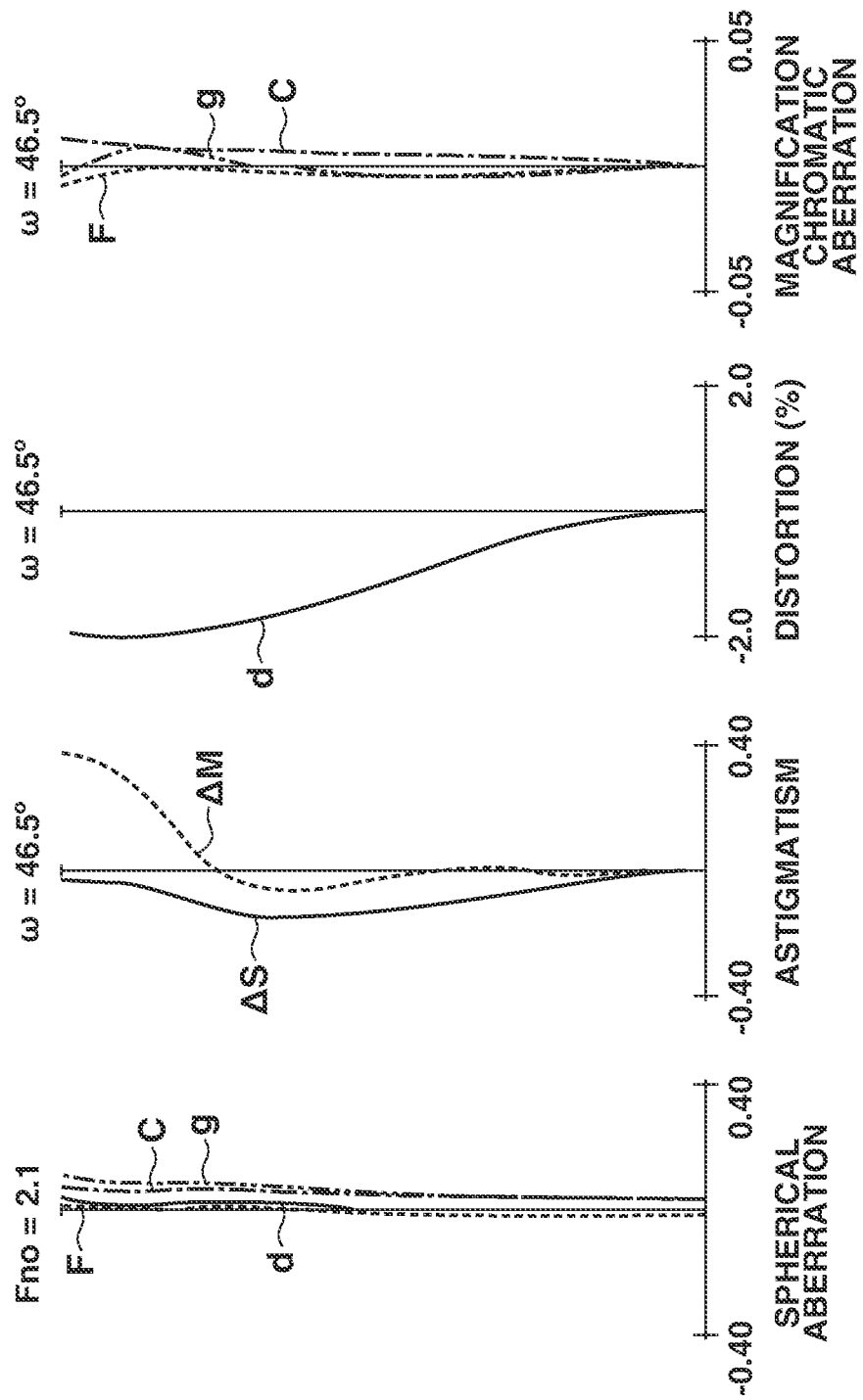
FIG. 4 is aberration diagrams of the optical system according to the second exemplary embodiment.

FIG. 3 is a cross-sectional view of an optical system OL according to a second exemplary embodiment. FIG. 4 is aberration diagrams of the optical system OL when focusing on an object at infinity. The optical system OL according to the second exemplary embodiment is a single-focus lens having a focal length of 20.5 mm and an F-number of 2.06.

The optical system OL consists of a front lens group Lf, an aperture stop SP, and a rear lens group Lr that are placed in order from an object side to an image side. The front lens group Lf is a first lens unit L1 having a negative refractive power, and the aperture stop SP and the rear lens group Lr are a second lens unit L2 having a positive refractive power. In focusing from an infinite distance to a closest distance, the first lens unit L1 does not move, and the second lens unit L2 moves to the object side, whereby a space between the first lens unit L1 and the second lens unit L2 changes.

A positive lens Lp is a lens placed farthest on the image side of the optical system OL and is also a lens Lm having the maximum effective diameter among lenses included in the rear lens group Lr. The positive lens Lp has a focal length of 37.35 mm, a half opening angle of 41.99 degrees, and an effective diameter of 36.46 mm. The radius of curvature of a lens surface on the image side of the positive lens Lp is configured to be smaller than the radius of curvature of a lens surface on the object side of the positive lens Lp.

A negative lens Ln is the ninth lens from the object side of the optical system OL. A positive lens Lpp is the sixth lens from the object side of the optical system OL and is placed adjacent to the aperture stop SP on the image side.

A lens La placed adjacent to the positive lens Lp on the object side includes a concave lens surface facing the image side.

With these components, as illustrated in the aberration diagrams in FIG. 4, it is possible to excellently correct various types of aberration while reducing the maximum angle of incidence of a ray on an image plane to 21°. Thus, it is possible to obtain an optical system that is small and inhibits a decrease in marginal illumination.

Figure 5:
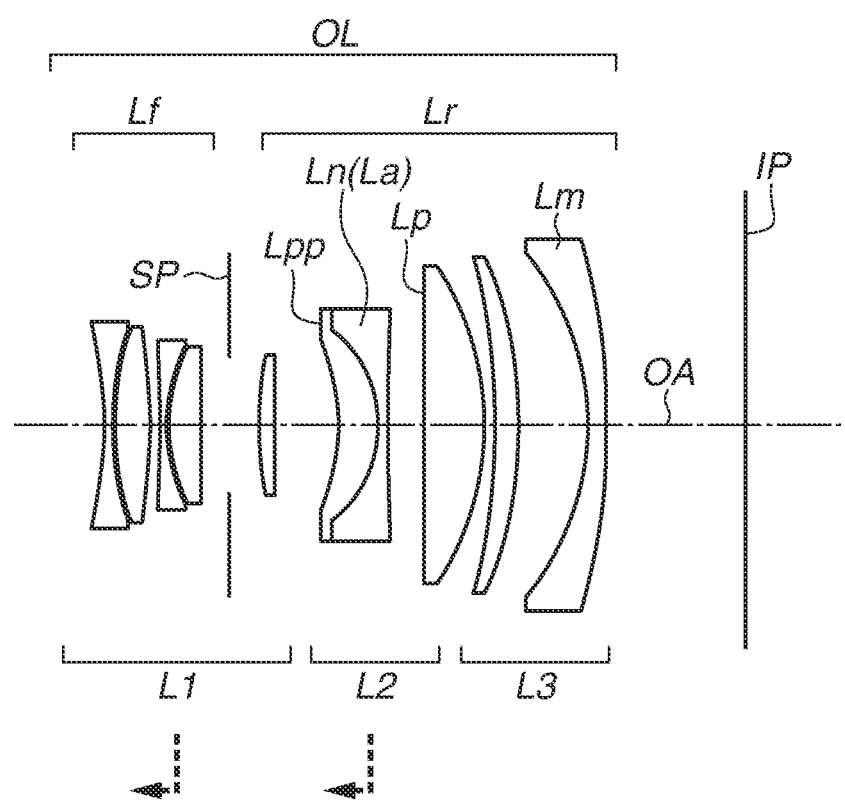
FIG. 5 is a cross-sectional view of an optical system according to a third exemplary embodiment.
Figure 6:
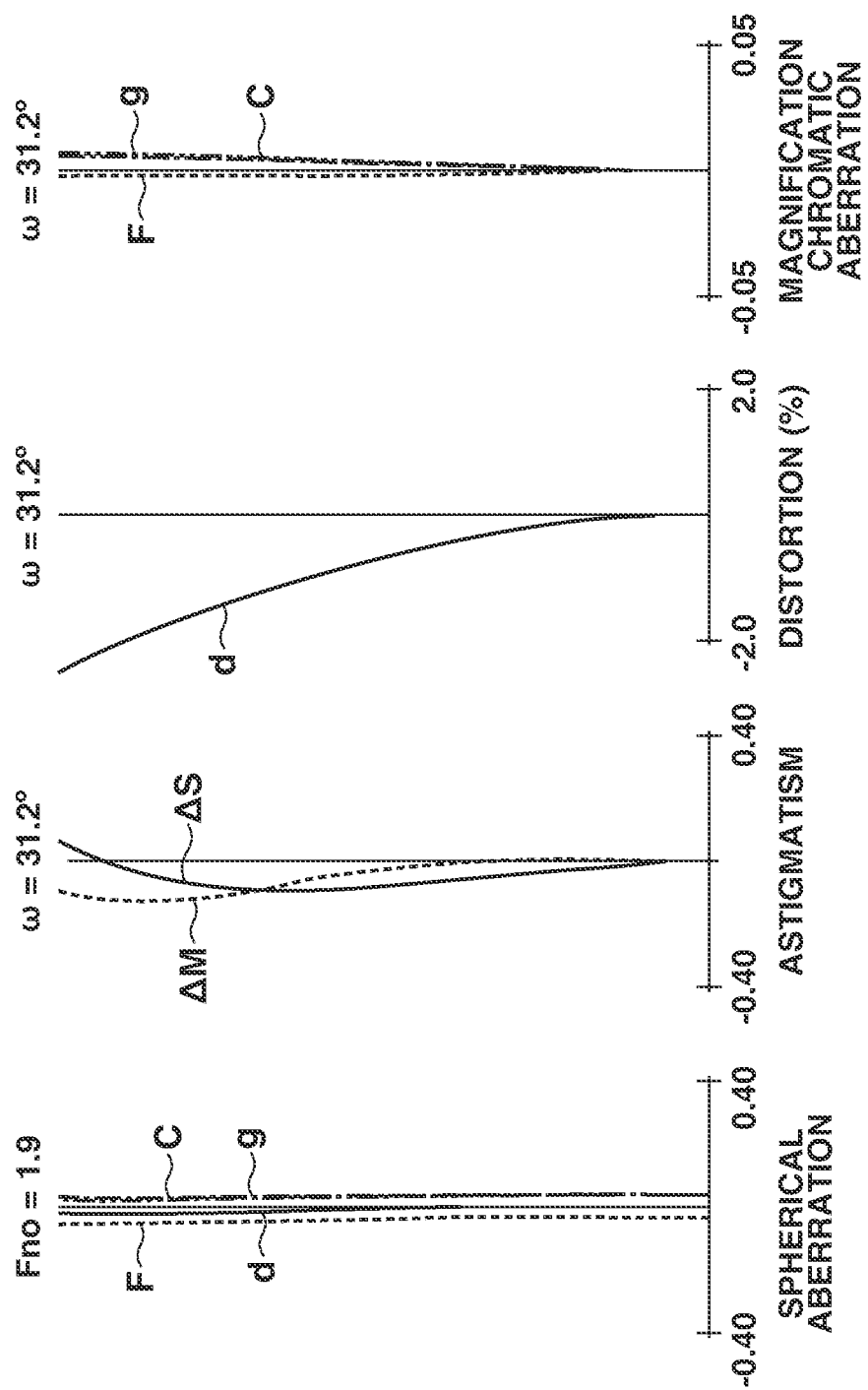
FIG. 6 is aberration diagrams of the optical system according to the third exemplary embodiment.

FIG. 5 is a cross-sectional view of an optical system OL according to a third exemplary embodiment. FIG. 6 is aberration diagrams of the optical system OL when focusing on an object at infinity. The optical system OL according to the third exemplary embodiment is a single-focus lens having a focal length of 35.7 mm and an F-number of 2.88.

The optical system OL consists of a front lens group Lf, an aperture stop SP, and a rear lens group Lr that are placed in order from an object side to an image side. The optical system OL consists of a first lens unit L1 having a positive refractive power, a second lens unit L2 having a positive refractive power, and a third lens unit L3 having a negative refractive power that are placed in order from the object side to the image side. The first lens unit L1 consists of five lenses and the aperture stop SP, and the aperture stop SP is placed between two of the lenses included in the first lens unit L1.

In focusing from an infinite distance to a closest distance, the first lens unit L1 and the second lens unit L2 move to the object side, and the third lens unit L3 does not move. In this focusing, a space between the first lens unit L1 and the second lens unit L2 and a space between the second lens unit L2 and the third lens unit L3 change.

A positive lens Lp is the eighth lens from the object side of the optical system OL. The positive lens Lp has a focal length of 27.33 mm, a half opening angle of 31.83 degrees, and an effective diameter of 28.09 mm. The radius of curvature of a lens surface on the image side of the positive lens Lp is configured to be smaller than the radius of curvature of a lens surface on the object side of the positive lens Lp.

A negative lens Ln is the seventh lens from the object side of the optical system OL and is also a lens La placed adjacent to the positive lens Lp on the object side. The negative lens Ln includes a concave lens surface facing the image side. A positive lens Lpp is placed on the object side of the negative lens Ln, and the positive lens Lpp and the negative lens Ln form a cemented lens. A lens Lm having the maximum effective diameter among lenses included in the rear lens group Lr is placed farthest on the image side of the optical system OL.

With these components, as illustrated in the aberration diagrams in FIG. 6, it is possible to excellently correct various types of aberration while reducing the maximum angle of incidence of a ray on an image plane to 27°. Thus, it is possible to obtain an optical system that is small and inhibits a decrease in marginal illumination.

Figure 7:
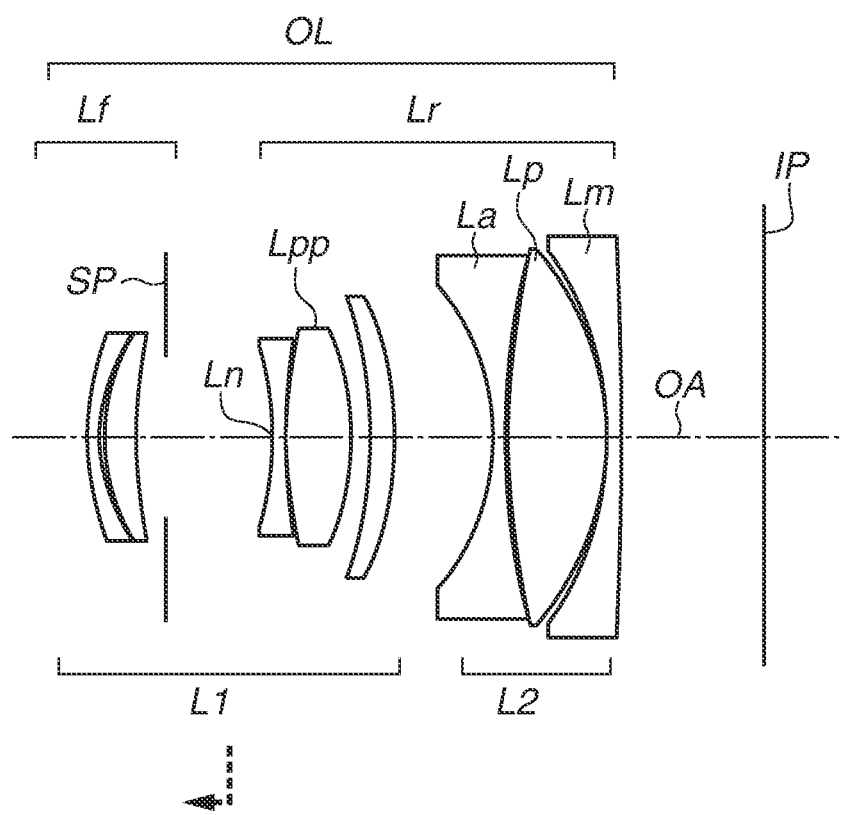
FIG. 7 is a cross-sectional view of an optical system according to a fourth exemplary embodiment.
Figure 8:
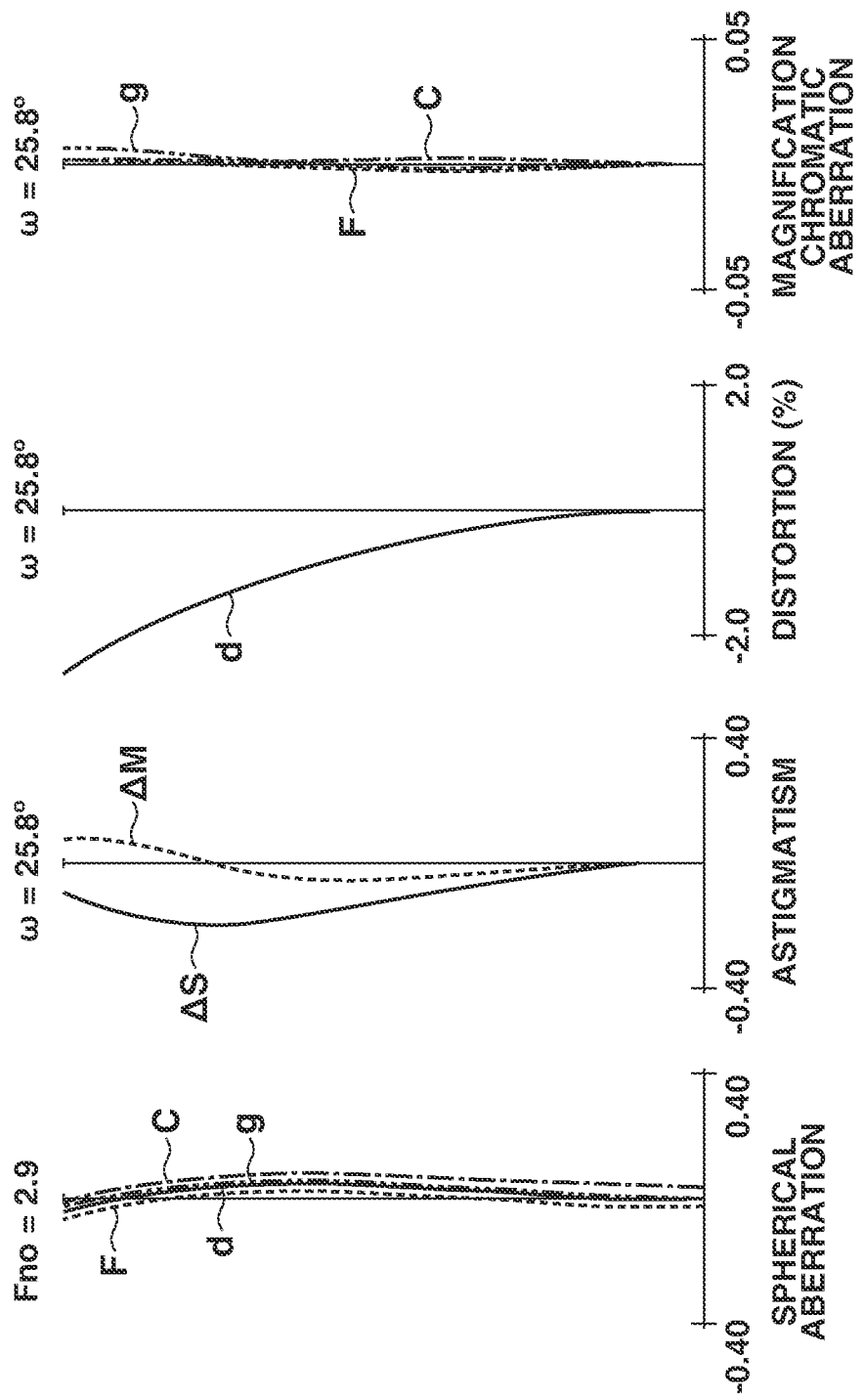
FIG. 8 is aberration diagrams of the optical system according to the fourth exemplary embodiment.

FIG. 7 is a cross-sectional view of an optical system OL according to a fourth exemplary embodiment. FIG. 8 is aberration diagrams of the optical system OL when focusing on an object at infinity. The optical system OL according to the fourth exemplary embodiment is a single-focus lens having a focal length of 44.7 mm and an F-number of 2.85.

The optical system OL consists of a front lens group Lf, an aperture stop SP, and a rear lens group Lr that are placed in order from an object side to an image side. The optical system OL consists of a first lens unit L1 having a positive refractive power and a second lens unit L2 having a negative refractive power that are placed in order from the object side to the image side. The first lens unit L1 consists of five lenses and the aperture stop SP, and the aperture stop SP is placed between two of the lenses included in the first lens unit L1. In focusing from an infinite distance to a closest distance, the first lens unit L1 moves to the object side, and the second lens unit L2 does not move, whereby a space between the first lens unit L1 and the second lens unit L2 changes.

A positive lens Lp has a focal length of 23.59 mm, a half opening angle of 38.65 degrees, and an effective diameter of 33.56 mm. The radius of curvature of a lens surface on the image side of the positive lens Lp is configured to be smaller than the radius of curvature of a lens surface on the object side of the positive lens Lp.

A negative lens Ln is the third lens from the object side of the optical system OL and is also a lens placed adjacent to the aperture stop SP on the image side. A positive lens Lpp is placed adjacent to the negative lens Ln on the image side. A lens Lm having the maximum effective diameter among lenses included in the rear lens group Lr is placed farthest on the image side of the optical system OL.

A lens La placed adjacent to the positive lens Lp on the object side includes a concave lens surface facing the image side.

With these components, as illustrated in the aberration diagrams in FIG. 8, it is possible to excellently correct various types of aberration while reducing the maximum angle of incidence of a ray on an image plane to 24°. Thus, it is possible to obtain an optical system that is small and inhibits a decrease in marginal illumination.

Figure 9:
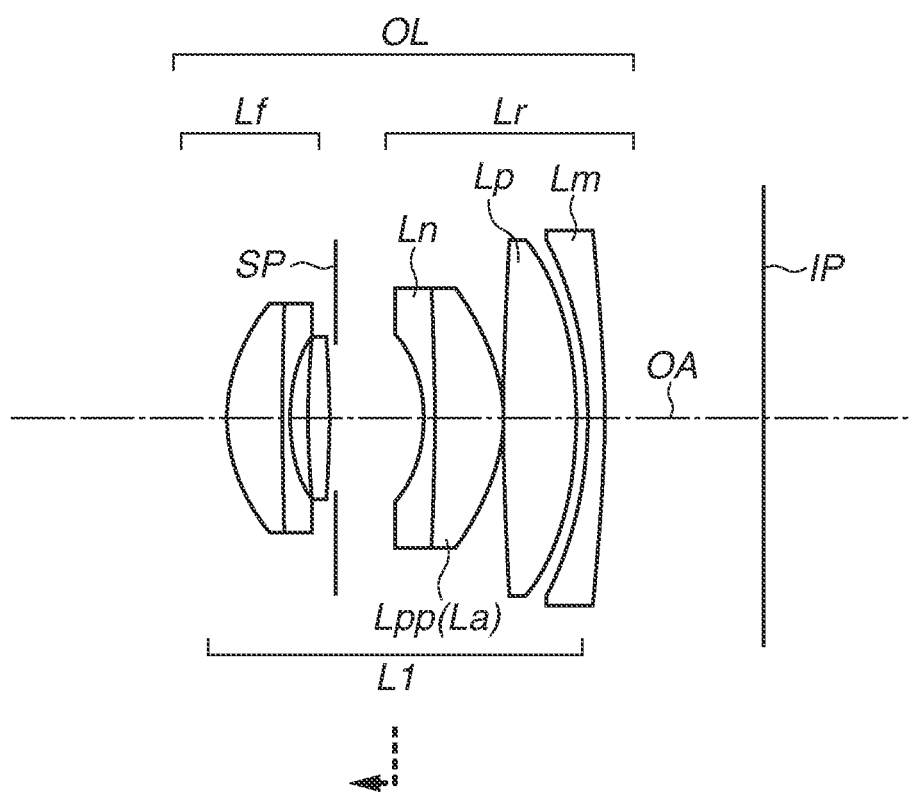
FIG. 9 is a cross-sectional view of an optical system according to a fifth exemplary embodiment.
Figure 10:
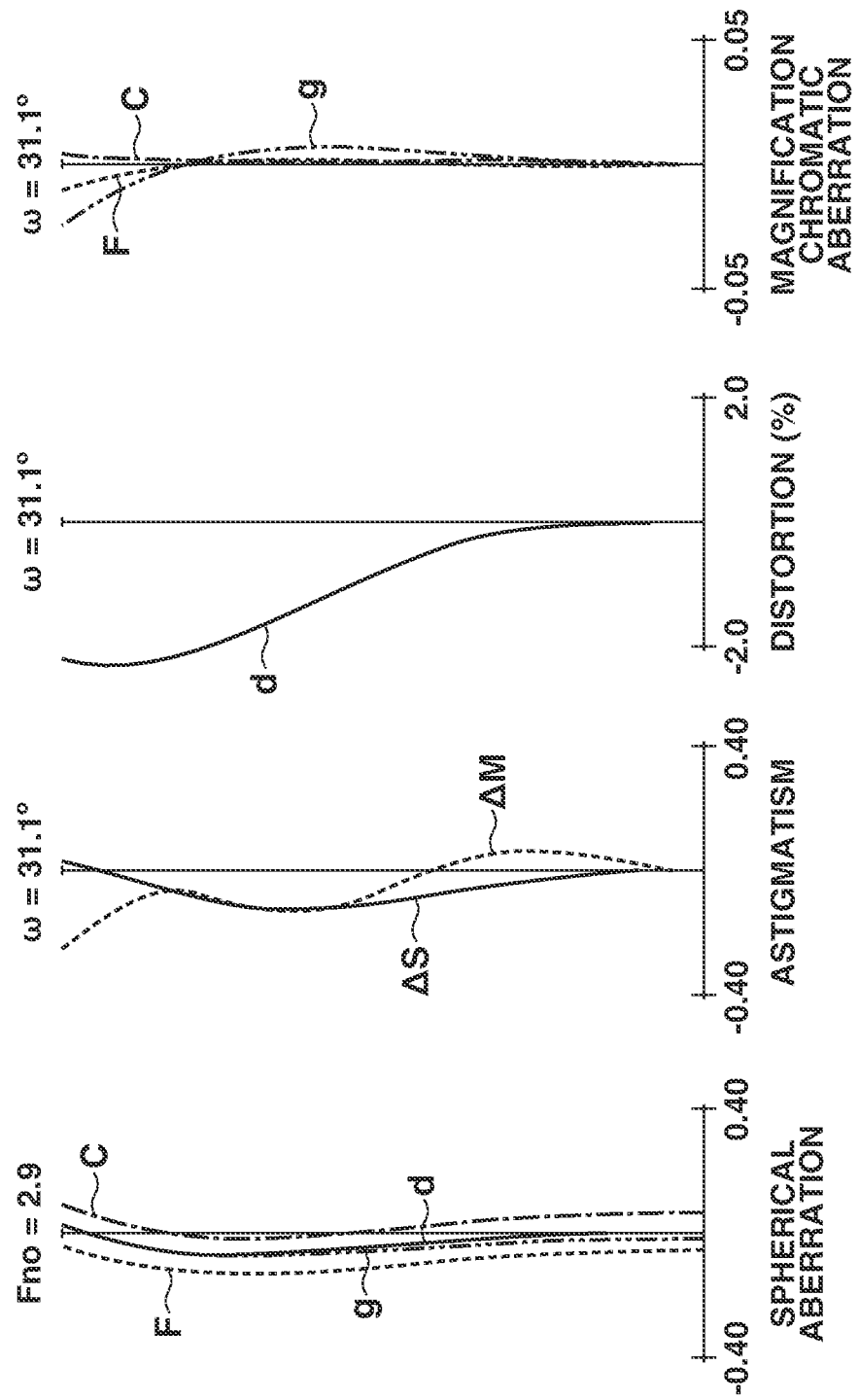
FIG. 10 is aberration diagrams of the optical system according to the fifth exemplary embodiment.

FIG. 9 is a cross-sectional view of an optical system OL according to a fifth exemplary embodiment. FIG. 10 is aberration diagrams of the optical system OL when focusing on an object at infinity. The optical system OL according to the fifth exemplary embodiment is a single-focus lens having a focal length of 35.9 mm and an F-number of 2.06.

The optical system OL consists of a front lens group Lf, an aperture stop SP, and a rear lens group Lr that are placed in order from an object side to an image side. In focusing from an infinite distance to a closest distance, the front lens group Lf, the aperture stop SP, and the rear lens group Lr move to the object side along the same moving trajectory, i.e., the entire optical system OL moves to the object side.

A positive lens Lp is the sixth lens from the object side of the optical system OL and has a focal length of 83.25 mm, a half opening angle of 29.94 degrees, and an effective diameter of 32.40 mm. The radius of curvature of a lens surface on the image side of the positive lens Lp is configured to be smaller than the radius of curvature of a lens surface on the object side of the positive lens Lp.

A negative lens Ln is the fourth lens from the object side of the optical system OL and is also a lens placed adjacent to the aperture stop SP on the image side. A positive lens Lpp is placed adjacent to the negative lens Ln on the image side, and the positive lens Lpp and the negative lens Ln form a cemented lens. The positive lens Lpp is also a lens La placed adjacent to the positive lens Lp on the object side. A lens Lm having the maximum effective diameter among lenses included in the rear lens group Lr is placed farthest on the image side of the optical system OL.

With these components, as illustrated in the aberration diagrams in FIG. 10, it is possible to excellently correct various types of aberration while reducing the maximum angle of incidence of a ray on an image plane to 27°. Thus, it is possible to obtain an optical system that is small and inhibits a decrease in marginal illumination.

Figure 11:
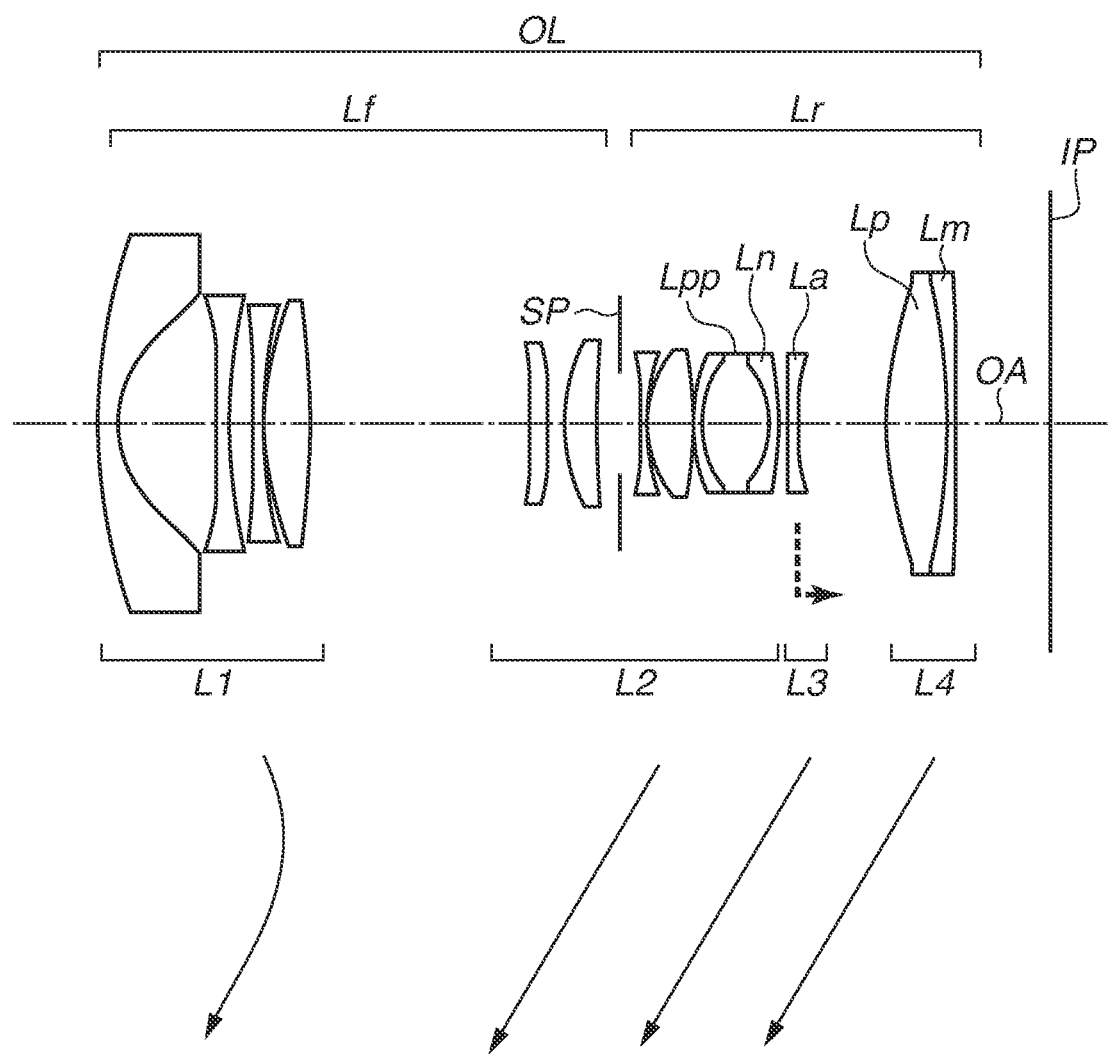
FIG. 11 is a cross-sectional view of an optical system according to a sixth exemplary embodiment.
Figure 12A:
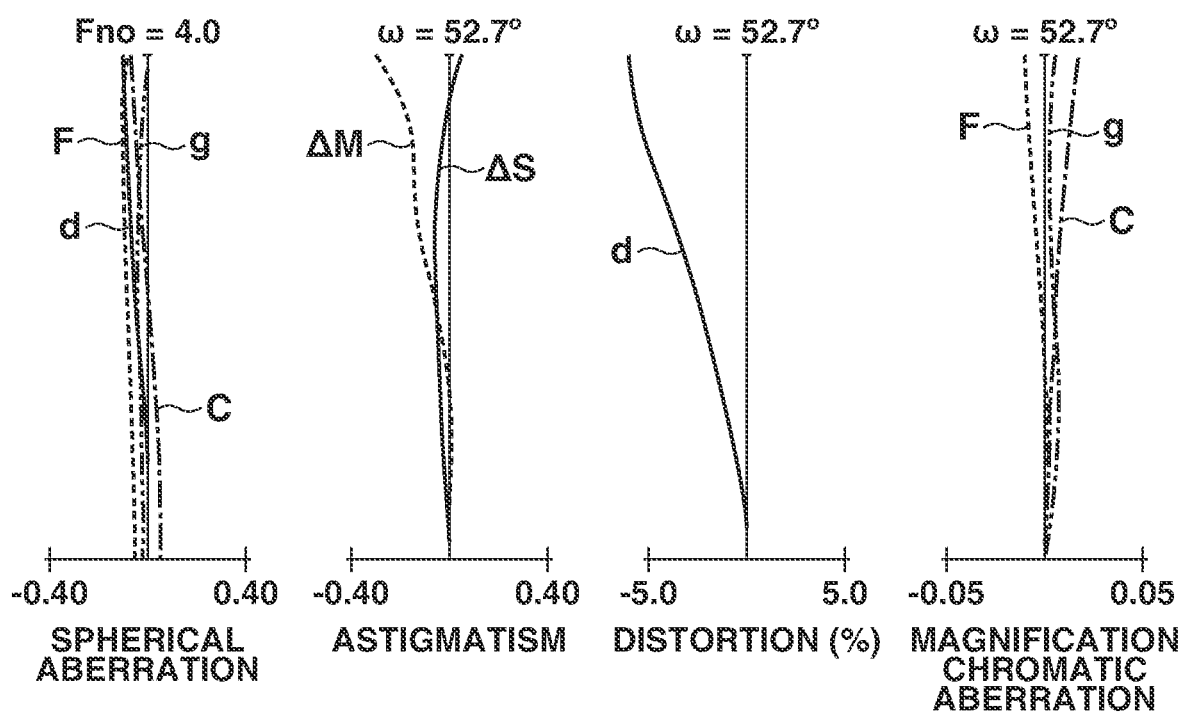
FIGS. 12A and 12B are aberration diagrams of the optical system according to the sixth exemplary embodiment.
Figure 12B:
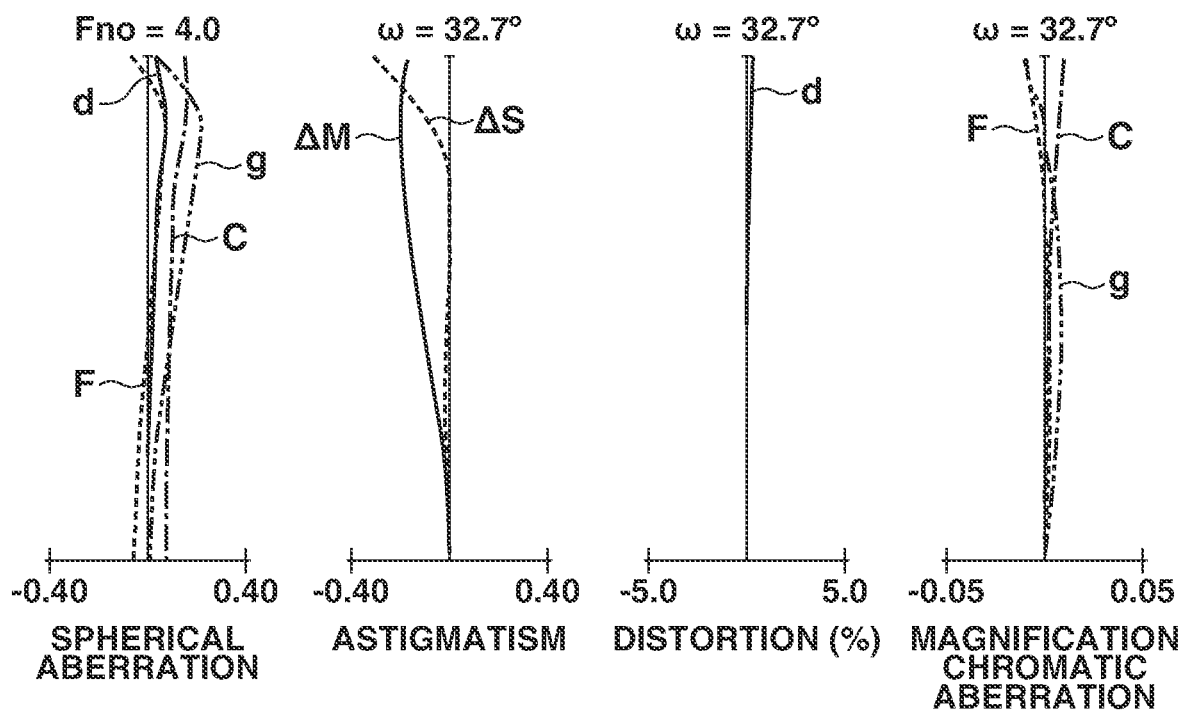

FIG. 11 is a cross-sectional view of an optical system OL according to a sixth exemplary embodiment at a wide-angle end. FIG. 12A is aberration diagrams of the optical system OL at a wide-angle end when focusing on an object at infinity. FIG. 12B is aberration diagrams of the optical system OL at a telephoto end when focusing on an object at infinity. The optical system OL according to the sixth exemplary embodiment is a zoom lens having a focal length of 16.5 mm to 33.8 mm, a zoom ratio of 2.1, and an F-number of 4.1.

The optical system OL consists of a front lens group Lf, an aperture stop SP, and a rear lens group Lr that are placed in order from an object side to an image side. The optical system OL consists of a first lens unit L1 having a negative refractive power, a second lens unit L2 having a positive refractive power, a third lens unit L3 having a negative refractive power, and a fourth lens unit L4 having a positive refractive power that are placed in order from the object side to the image side. In zooming from the wide-angle end to the telephoto end, a space between adjacent lens units changes. In this zooming, the first lens unit L1 moves to the image side and then moves to the object side. The second lens unit L2, the third lens unit L3, and the fourth lens unit L4 move to the object side. In this zooming, the space between the first lens unit L1 and the second lens unit L2 narrows, the space between the second lens unit L2 and the third lens unit L3 widens, and the space between the third lens unit L3 and the fourth lens unit L4 narrows. In focusing from an infinite distance to a closest distance, the third lens unit L3 moves to the image side.

A positive lens Lp is the thirteenth lens from the object side of the optical system OL and has a focal length of 49.18 mm, a half opening angle of 20.54 degrees, and an effective diameter of 34.51 mm. The radius of curvature of a lens surface on the image side of the positive lens Lp is configured to be smaller than the radius of curvature of a lens surface on the object side of the positive lens Lp.

A negative lens Ln is the eleventh lens from the object side of the optical system OL. A lens Lpp is placed adjacent to the negative lens Ln on the object side, and a lens placed on the object side of the positive lens Lpp, the positive lens Lpp, and the negative lens Ln form a cemented lens.

A lens La placed adjacent to the positive lens Lp on the object side includes a concave lens surface facing the image side. A lens Lm having the maximum effective diameter among lenses included in the rear lens group Lr is placed farthest on the image side of the optical system OL.

As in the present exemplary embodiment, in a case where the optical system OL is a zoom lens, an incidence height of the off-axis beam passing through the positive lens Lp at the wide-angle end is configured to be greater than an incidence height of the off-axis beam passing through the positive lens Lp at the telephoto end. Consequently, at the wide-angle end, where the maximum angle of incidence of the ray on the image plane is more likely to be large, the effect of reducing the angle of incidence of the ray on the image plane is larger. Thus, it is possible to reduce fluctuations in the maximum angle of incidence in the entire zoom area.

With these components, as illustrated in the aberration diagrams in FIGS. 12A and 12B, it is possible to excellently correct various types of aberration while reducing the maximum angle of incidence of a ray on an image plane to 23°. Thus, it is possible to obtain an optical system that is small and inhibits a decrease in marginal illumination.

Although the present exemplary embodiment is a case where the positive lens Lp is a component of a cemented lens, the positive lens Lp may be formed of a single lens in the zoom lens.

While the exemplary embodiments of the optical system according to the present invention have been described above, the optical system according to the present invention is not limited to these exemplary embodiments and can be modified and changed in various manners within the scope of the present invention. For example, all or part of a certain lens unit in the optical system may be an image stabilization lens unit and be moved in a direction in which the image stabilization lens unit includes a radial direction component for the purpose of image stabilization.

NUMERICAL EXAMPLES

Numerical examples 1 to 6 corresponding to the first to sixth exemplary embodiments, respectively, are illustrated below. In numerical examples 1 to 6, a surface number represents the order of optical surfaces from the object side. The radius of curvature (mm) of an optical surface is represented by R, the space (mm) between adjacent optical surfaces is represented by D, and the refractive index and the Abbe number of a material of an optical member are represented by nd and vd, respectively, based on the d-line. Where the refractive indices of the material with respect to the g-line (wavelength of 435.8 nm), the F-line (486.1 nm), the d-line (587.6 nm), and the C-line (656.3 nm), which are the Fraunhofer lines, are Ng, NF, Nd, and NC, respectively, the Abbe number vd is represented by vd=(Nd−1)/(NF−NC). A back focus is represented by BF.

The overall lens length is a distance obtained by adding the back focus to a distance on the optical axis from an optical surface farthest on the object side to an optical surface farthest on the image side.

In each of the numerical examples, "*" is added to the right of the surface number of an aspheric surface. An aspheric shape is represented by:

$$X = \frac{H^2/R}{1+\sqrt{1-(1+K)(H/R)^2}} + B \cdot H^4 + C \cdot H^6 + D \cdot H^8 + E \cdot H^{10} + F \cdot H^{12},$$

where the optical axis direction is an X-axis, a direction perpendicular to the optical axis is an H-axis, a traveling direction of light is positive, a paraxial curvature radius is R, a conic constant is K, and aspheric coefficients are B, C, D, E, and F. In each of the aspheric coefficients, "E±x" means $10^{\pm x}$.

Table 1 illustrates parameters used in conditional expressions (1) to (20) in numerical examples 1 to 6. Table 2 illustrates values corresponding to conditional expressions (1) to (20) in numerical examples 1 to 6.

Numerical Example 1

Unit: mm

Surface Data

| Surface number | R | D | Nd | vd | Effective diameter |
|---|---|---|---|---|---|
| 1 | −837.414 | 1.40 | 1.80810 | 22.8 | 29.97 |
| 2 | 35.178 | 4.68 | | | 27.43 |
| 3 | 75.060 | 3.35 | 2.00100 | 29.1 | 26.23 |
| 4 | −88.847 | 3.50 | | | 25.76 |
| 5 | −55.800 | 1.20 | 1.58032 | 41.2 | 21.49 |
| 6 | 17.607 | 5.86 | 1.91082 | 35.3 | 22.21 |
| 7 | −5487.199 | 4.56 | | | 21.86 |
| 8 (stop) | ∞ | 2.79 | | | 20.24 |
| 9 | 84.383 | 1.80 | 1.72916 | 54.7 | 19.06 |
| 10 | −278.246 | 3.64 | | | 18.72 |
| 11* | −34.597 | 6.50 | 1.76802 | 49.2 | 17.26 |
| 12 | −12.673 | 1.10 | 1.74077 | 27.8 | 17.45 |
| 13 | 121.499 | 4.90 | | | 21.02 |
| 14 | 200.119 | 7.18 | 1.80400 | 46.6 | 29.78 |
| 15 | −28.591 | (variable) | | | 31.16 |
| 16 | −90.842 | 2.70 | 1.81325 | 45.8 | 33.00 |
| 17 | −46.016 | 10.20 | | | 33.31 |
| 18 | −26.079 | 1.65 | 1.59270 | 35.3 | 32.44 |
| 19 | −79.756 | (variable) | | | 35.06 |
| Image plane | ∞ | | | | |

Aspheric Surface Data

Eleventh Surface

K = 0.0000E+00  B = −3.1662E−05  C = −9.2057E−08
D = 8.4502E−11  E = −1.7333E−12  F = 0.0000E+00

Various Types of Data

| | |
|---|---|
| Focal length | 35.70 |
| Fno | 1.85 |
| Half angle of view (degrees) | 31.22 |
| Image height | 21.64 |
| Overall lens length | 81.87 |
| BF | 13.49 |
| Entrance pupil position | 16.36 |
| Exit pupil position | −41.76 |
| Front principal point position | 28.99 |
| Rear principal point position | −22.21 |
| d15 | 1.36 |
| d19 | 13.49 |

Lens Unit Data

| Unit | Starting surface | Focal length | Lens structure length | Front principal point position | Rear principal point position |
|---|---|---|---|---|---|
| 1 | 1 | 35.61 | 52.48 | 35.32 | −6.26 |
| 2 | 16 | −197.90 | 14.55 | 27.50 | 12.99 |

Single Lens Data

| Lens | Starting surface | Focal length |
|---|---|---|
| 1 | 1 | −41.750 |
| 2 | 3 | 41.070 |
| 3 | 5 | −22.930 |
| 4 | 6 | 19.280 |
| 5 | 9 | 88.980 |
| 6 | 11 | 23.070 |
| 7 | 12 | −15.440 |
| 8 | 14 | 31.560 |
| 9 | 16 | 111.650 |
| 10 | 18 | −66.130 |

Numerical Example 2

Unit: mm

Surface Data

| Surface number | R | D | Nd | vd | Effective diameter |
|---|---|---|---|---|---|
| 1 | 34.417 | 2.20 | 1.72916 | 54.7 | 37.25 |
| 2 | 16.502 | 0.20 | | | 28.58 |
| 3* | 16.948 | 1.80 | 1.58313 | 59.4 | 28.32 |
| 4* | 13.106 | 11.56 | | | 25.27 |
| 5 | −31.273 | 1.30 | 1.48749 | 70.2 | 24.72 |
| 6 | 22.562 | 2.80 | | | 23.15 |
| 7 | 30.719 | 8.49 | 1.88300 | 40.8 | 23.65 |
| 8 | −23.294 | 0.90 | 1.85478 | 24.8 | 22.85 |
| 9 | −53.295 | (variable) | | | 22.09 |
| 10 (stop) | ∞ | 0.96 | | | 18.83 |
| 11* | 20.088 | 8.58 | 1.58313 | 59.4 | 18.92 |
| 12 | −14.953 | 1.00 | 1.83481 | 42.7 | 17.70 |
| 13 | −28.429 | 0.15 | | | 17.57 |
| 14 | 59.345 | 4.96 | 1.59522 | 67.7 | 17.78 |
| 15 | −16.759 | 1.00 | 1.61293 | 37.0 | 17.68 |
| 16 | 22.212 | 3.77 | | | 17.48 |
| 17 | −24.187 | 1.30 | 1.85135 | 40.1 | 17.63 |
| 18* | −47.158 | 5.03 | | | 19.37 |
| 19 | 102.175 | 11.18 | 1.59522 | 67.7 | 34.21 |
| 20 | −27.253 | (variable) | | | 36.46 |
| Image plane | ∞ | | | | |

Aspheric Surface Data

Third Surface

K = 0.0000E+00  B = 1.7106E−05  C = −9.2057E−08
D = 8.4502E−11  E = −1.7333E−12  F = 0.0000E+00

Fourth Surface

K = −1.1029E+00  B = 6.6803E−05  C = 1.5440E−07
D = −2.6047E−10  E = 2.7484E−12  F = 0.0000E+00

Eleventh Surface

K = 0.0000E+00  B = −1.6574E−06  C = 8.4594E−09
D = −8.7895E−11  E = 2.4378E−12  F = 0.0000E+00

Eighteenth Surface

K = 0.0000E+00  B = 6.7655E−05  C = 1.6693E−07
D = 1.7835E−09  E = −8.5459E−12  F = 0.0000E+00

Various Types of Data

| | |
|---|---|
| Focal length | 20.50 |
| Fno | 2.06 |
| Half Angle of View (Degrees) | 46.54 |
| Image height | 21.64 |
| Overall lens length | 90.13 |
| BF | 13.50 |
| Entrance pupil position | 18.26 |
| Exit pupil position | −56.98 |
| Front principal point position | 32.79 |
| Rear principal point position | −7.00 |
| d9 | 9.45 |
| d20 | 13.50 |

Lens Unit Data

| Unit | Starting surface | Focal length | Lens structure length | Front principal point position | Rear principal point position |
|---|---|---|---|---|---|
| 1 | 1 | −205.97 | 29.25 | −74.38 | −158.89 |
| 2 | 10 | 35.39 | 37.93 | 16.68 | −25.42 |

Unit: mm

Single Lens Data

| Lens | Starting surface | Focal length |
|---|---|---|
| 1 | 1 | −45.850 |
| 2 | 3 | −119.850 |
| 3 | 5 | −26.670 |
| 4 | 7 | 16.200 |
| 5 | 8 | −49.090 |
| 6 | 11 | 16.160 |
| 7 | 12 | −39.110 |
| 8 | 14 | 22.500 |
| 9 | 15 | −15.430 |
| 10 | 17 | −59.880 |
| 11 | 19 | 37.350 |

Numerical Example 3

Unit: mm

Surface Data

| Surface number | R | D | Nd | vd | Effective diameter |
|---|---|---|---|---|---|
| 1 | −38.673 | 0.90 | 1.72825 | 28.5 | 17.68 |
| 2 | 27.661 | 0.26 | | | 16.44 |
| 3 | 30.504 | 3.12 | 1.91082 | 35.3 | 16.41 |
| 4 | −54.805 | 1.02 | | | 15.87 |
| 5 | −111.495 | 0.80 | 1.51742 | 52.4 | 14.27 |
| 6 | 17.350 | 0.14 | | | 13.03 |
| 7 | 16.698 | 2.75 | 1.88100 | 40.1 | 13.13 |
| 8 | 124.168 | 2.73 | | | 12.88 |
| 9 (stop) | ∞ | 2.80 | | | 12.34 |
| 10 | 38.650 | 1.41 | 1.76385 | 48.5 | 11.67 |
| 11 | 516.587 | (variable) | | | 11.42 |
| 12* | −23.400 | 3.71 | 1.76802 | 49.2 | 14.93 |
| 13 | −10.852 | 0.90 | 1.78472 | 25.7 | 16.15 |
| 14 | 234.754 | 3.28 | | | 20.09 |
| 15 | 1103.025 | 5.73 | 1.95375 | 32.3 | 26.79 |
| 16 | −26.627 | (variable) | | | 28.09 |
| 17 | −60.697 | 2.16 | 1.88300 | 40.8 | 29.58 |
| 18 | −38.698 | 6.59 | | | 30.00 |
| 19 | −24.580 | 1.60 | 1.59551 | 39.2 | 30.44 |
| 20 | −62.769 | (variable) | | | 33.27 |
| Image plane | ∞ | | | | |

Aspheric Surface Data
Twelfth Surface

K = 0.0000E+00    B = −4.4141E−05    C = −2.9439E−08
D = −2.0859E−09   E = 5.6739E−12     F = 0.0000E+00

Various Types of Data

| Focal length | 35.70 |
|---|---|
| Fno | 2.88 |
| Half angle of view (degrees) | 31.22 |
| Image height | 21.64 |
| Overall lens length | 60.00 |
| BF | 13.15 |
| Entrance pupil position | 7.95 |
| Exit pupil position | −35.67 |
| Front principal point position | 17.54 |
| Rear principal point position | −22.55 |
| d11 | 5.96 |
| d16 | 1.00 |
| d20 | 13.15 |

Unit: mm

Lens Unit Data

| Unit | Starting surface | Focal length | Lens structure length | Front principal point position | Rear principal point position |
|---|---|---|---|---|---|
| 1 | 1 | 31.46 | 15.92 | 8.84 | −2.82 |
| 2 | 12 | 97.71 | 13.63 | 30.42 | 31.28 |
| 3 | 17 | −186.70 | 10.35 | 13.87 | 4.79 |

Single Lens Data

| Lens | Starting surface | Focal length |
|---|---|---|
| 1 | 1 | −22.020 |
| 2 | 3 | 21.900 |
| 3 | 5 | −28.950 |
| 4 | 7 | 21.640 |
| 5 | 10 | 54.620 |
| 6 | 12 | 23.350 |
| 7 | 13 | −13.200 |
| 8 | 15 | 27.330 |
| 9 | 17 | 115.600 |
| 10 | 19 | −68.920 |

Numerical Example 4

Unit: mm

Surface Data

| Surface number | R | D | Nd | vd | Effective diameter |
|---|---|---|---|---|---|
| 1 | 25.629 | 1.20 | 1.77799 | 26.0 | 17.84 |
| 2 | 16.647 | 0.36 | | | 17.36 |
| 3 | 17.958 | 2.96 | 1.88300 | 40.8 | 17.48 |
| 4 | 45.739 | 2.70 | | | 17.12 |
| 5 (stop) | ∞ | 10.00 | | | 14.24 |
| 6 | −27.137 | 1.20 | 1.77090 | 26.2 | 15.92 |
| 7 | 62.111 | 0.15 | | | 16.52 |
| 8* | 44.640 | 5.82 | 1.88300 | 40.8 | 16.69 |
| 9 | −25.683 | 1.72 | | | 18.68 |
| 10 | −40.206 | 2.38 | 1.84666 | 23.9 | 23.91 |
| 11 | −29.638 | (variable) | | | 4.70 |
| 12 | −20.376 | 1.20 | 1.64706 | 33.0 | 26.47 |
| 13 | 76.356 | 0.16 | | | 32.30 |
| 14 | 77.987 | 9.12 | 1.88300 | 40.8 | 32.69 |
| 15 | −26.863 | 0.15 | | | 33.56 |
| 16 | −28.818 | 1.20 | 1.59517 | 38.5 | 33.36 |
| 17 | −493.584 | (variable) | | | 35.55 |
| Image plane | ∞ | | | | |

Aspheric Surface Data
Eighth Surface

K = 0.0000E+00    B = −2.0857E−05    C = 5.9814E−08
D = −2.2894E−10   E = 4.7502E−13     F = 0.0000E+00

Various Types of Data

| Focal length | 44.70 |
|---|---|
| Fno | 2.85 |
| Half angle of view (degrees) | 25.83 |
| Image height | 21.64 |
| Overall lens length | 62.63 |
| BF | 13.13 |
| Entrance pupil position | 6.02 |
| Exit pupil position | −37.96 |
| Front principal point position | 11.62 |
| Rear principal point position | −31.56 |
| d11 | 9.18 |
| d17 | 13.13 |

-continued

Unit: mm

Lens Unit Data

| Unit | Starting surface | Focal length | Lens structure length | Front principal point position | Rear principal point position |
|---|---|---|---|---|---|
| 1 | 1 | 33.12 | 28.50 | 19.35 | −10.14 |
| 2 | 12 | −76.69 | 11.82 | −6.06 | −13.67 |

Single Lens Data

| Lens | Starting surface | Focal length |
|---|---|---|
| 1 | 1 | −64.840 |
| 2 | 3 | 31.890 |
| 3 | 6 | −24.360 |
| 4 | 8 | 19.210 |
| 5 | 10 | 120.730 |
| 6 | 12 | −24.740 |
| 7 | 14 | 23.590 |
| 8 | 16 | −51.470 |

Numerical Example 5

Unit: mm

Surface Data

| Surface number | R | D | Nd | vd | Effective diameter |
|---|---|---|---|---|---|
| 1 | 16.662 | 5.02 | 2.00100 | 29.1 | 20.33 |
| 2 | 212.406 | 0.90 | 1.89286 | 20.4 | 17.92 |
| 3 | 15.827 | 1.67 | | | 14.31 |
| 4* | 61.177 | 1.90 | 1.85135 | 40.1 | 14.27 |
| 5* | 1125.069 | 0.67 | | | 14.07 |
| 6 (stop) | ∞ | 8.33 | | | 13.66 |
| 7 | −13.016 | 0.90 | 1.72825 | 28.5 | 14.85 |
| 8 | −242.788 | 6.46 | 1.85135 | 40.1 | 19.47 |
| 9* | −14.291 | 0.15 | | | 23.23 |
| 10 | 344.603 | 6.81 | 1.83481 | 42.7 | 30.90 |
| 11* | −86.277 | 1.00 | | | 32.40 |
| 12 | −38.941 | 1.63 | 1.64769 | 33.8 | 32.60 |
| 13 | −152.656 | (variable) | | | 34.37 |
| Image plane | ∞ | | | | |

Aspheric Surface Data

Fourth Surface

K = 0.0000E+00  B = −7.6176E−05  C = −5.2215E−08
D = −4.1896E−09  E = 4.7502E−13  F = 0.0000E+00

Fifth Surface

K = 0.0000E+00  B = −7.5876E−05  C = −5.2454E−08
D = −4.2425E−09  E = 5.0437E−12  F = 0.0000E+00

Ninth Surface

K = 0.0000E+00  B = 8.3111E−05  C = 1.1290E−07
D = −6.7559E−11  E = 5.8465E−12  F = 0.0000E+00

Eleventh Surface

K = 0.0000E+00  B = −6.8949E−05  C = 1.9512E−07
D = −4.6150E−10  E = 4.9411E−13  F = 0.0000E+00

Various Types of Data

| | |
|---|---|
| Focal length | 35.91 |
| Fno | 2.06 |
| Half angle of view (degrees) | 31.07 |
| Image height | 21.64 |
| Overall lens length | 50.50 |
| BF | 15.05 |

Unit: mm

| | |
|---|---|
| Entrance pupil position | 9.00 |
| Exit pupil position | −27.75 |
| Front principal point position | 14.78 |
| Rear principal point position | −20.86 |
| d13 | 15.05 |

Lens Unit Data

| Unit | Starting surface | Focal length | Lens structure length | Front principal point position | Rear principal point position |
|---|---|---|---|---|---|
| 1 | 1 | 35.91 | 35.45 | 14.78 | −20.86 |

Single Lens Data

| Lens | Starting surface | Focal length |
|---|---|---|
| 1 | 1 | 17.830 |
| 2 | 2 | −19.190 |
| 3 | 4 | 75.930 |
| 4 | 7 | −18.920 |
| 5 | 8 | 17.610 |
| 6 | 10 | 83.250 |
| 7 | 12 | −81.170 |

Numerical Example 6

Unit: mm

Surface Data

| Surface number | R | D | Nd | vd | Effective diameter |
|---|---|---|---|---|---|
| 1* | 104.054 | 2.50 | 1.76802 | 49.2 | 45.91 |
| 2* | 13.602 | 12.00 | | | 31.66 |
| 3* | 64.613 | 1.80 | 1.83220 | 40.1 | 30.21 |
| 4* | 35.368 | 2.86 | | | 28.79 |
| 5 | −127.884 | 1.00 | 1.59522 | 67.7 | 28.70 |
| 6 | 57.293 | 0.20 | | | 28.74 |
| 7 | 37.990 | 5.72 | 1.80610 | 33.3 | 29.17 |
| 8 | −124.870 | (variable) | | | 28.79 |
| 9 | −78.343 | 2.41 | 1.78442 | 48.1 | 17.62 |
| 10 | −45.720 | 1.71 | | | 18.20 |
| 11 | 21.878 | 4.06 | 1.77888 | 48.8 | 19.17 |
| 12 | 197.854 | 2.82 | | | 18.53 |
| 13 (stop) | ∞ | 2.67 | | | 17.27 |
| 14 | −48.298 | 0.74 | 1.91138 | 35.2 | 16.31 |
| 15 | 26.393 | 0.15 | | | 16.10 |
| 16 | 14.877 | 5.52 | 1.49700 | 81.5 | 16.78 |
| 17 | −42.678 | 0.15 | | | 16.42 |
| 18 | 21.573 | 1.00 | 1.85150 | 40.8 | 15.31 |
| 19 | 11.767 | 8.22 | 1.56560 | 49.5 | 14.13 |
| 20 | −10.812 | 1.00 | 1.83220 | 40.1 | 12.59 |
| 21* | −48.387 | (variable) | | | 13.67 |
| 22 | 322.013 | 1.12 | 1.83707 | 41.7 | 14.93 |
| 23* | 28.916 | (variable) | | | 15.63 |
| 24 | 47.935 | 7.55 | 1.59270 | 35.3 | 33.64 |
| 25 | −70.015 | 1.10 | 1.83481 | 42.7 | 34.51 |
| 26 | −321.558 | (variable) | | | 35.58 |
| Image plane | ∞ | | | | |

Aspheric Surface Data

First Surface

K = 0.0000E+00  B = 1.1865E−05  C = −2.3678E−08
D = 1.1358E−11  E = 1.1654E−14  F = −1.9116E−18

Second Surface

K = −1.0908E+00  B = 2.6285E−05  C = 8.5778E−08
D = −3.5421E−10  E = 7.8718E−13  F = −5.5703E−15

-continued

Unit: mm

Third Surface

K = 0.0000E+00  B = −1.2210E−04  C = 5.2126E−07
D = −1.4530E−09 E = 1.7965E−12   F = 0.0000E+00

Fourth Surface

K = 9.1838E−01  B = −1.1915E−04  C = 6.0146E−07
D = −1.9362E−09 E = 3.6929E−12   F = 0.0000E+00

Twenty-First Surface

K = 0.0000E+00  B = 4.0811E−05   C = 2.9340E−07
D = 8.9338E−10  E = 3.0453E−11   F = 0.0000E+00

Twenty-Third Surface

K = 0.0000E+00  B = 6.1229E−06   C = −7.6025E−08
D = −7.2438E−10 E = 1.9471E−12   F = 0.0000E+00

Various Types of Data

|  | Wide-angle end | Middle | Telephoto end |
|---|---|---|---|
| Focal length | 16.48 | 24.02 | 33.75 |
| Fno | 4.12 | 4.12 | 4.12 |
| Half angle of view (degrees) | 52.70 | 42.01 | 32.66 |
| Image height | 21.64 | 21.64 | 21.64 |
| Overall lens length | 117.64 | 109.16 | 110.13 |
| BF | 11.50 | 19.17 | 29.63 |
| Entrance pupil position | 16.79 | 15.20 | 13.87 |
| Exit pupil position | −34.73 | −33.12 | −32.06 |
| Front principal point position | 27.40 | 28.19 | 29.16 |
| Rear principal point position | −4.98 | −4.85 | −4.12 |
| d8 | 27.41 | 11.26 | 1.77 |
| d21 | 1.42 | 3.20 | 4.34 |
| d23 | 11.02 | 9.24 | 8.10 |
| d26 | 11.50 | 19.17 | 29.63 |

Lens Unit Data

| Unit | Starting surface | Focal length | Lens structure length | Front principal point position | Rear principal point position |
|---|---|---|---|---|---|
| 1 | 1 | −24.46 | 26.08 | −0.74 | −25.04 |
| 2 | 9 | 25.51 | 30.45 | 4.59 | −17.68 |
| 3 | 22 | −38.02 | 1.12 | 0.67 | 0.06 |
| 4 | 24 | 86.66 | 8.65 | −0.22 | −5.55 |

Single Lens Data

| Lens | Starting surface | Focal length |
|---|---|---|
| 1 | 1 | −20.620 |
| 2 | 3 | −96.600 |

-continued

Unit: mm

| 3 | 5 | −66.340 |
|---|---|---|
| 4 | 7 | 36.710 |
| 5 | 9 | 135.570 |
| 6 | 11 | 31.270 |
| 7 | 14 | −18.640 |
| 8 | 16 | 22.930 |
| 9 | 18 | −31.900 |
| 10 | 19 | 11.470 |
| 11 | 20 | −16.940 |
| 12 | 22 | −38.020 |
| 13 | 24 | 49.180 |
| 14 | 25 | −107.430 |

TABLE 1

|  | Numerical example 1 | Numerical example 2 | Numerical example 3 | Numerical example 4 | Numerical example 5 | Numerical example 6 |
|---|---|---|---|---|---|---|
| Φp | 31.160 | 36.460 | 28.090 | 33.560 | 32.400 | 34.510 |
| Φr | 35.060 | 36.460 | 33.270 | 35.550 | 34.370 | 35.580 |
| Φpp | 17.450 | 17.700 | 16.150 | 18.680 | 23.230 | 14.130 |
| Φa | 21.020 | 19.370 | 20.090 | 32.300 | 23.230 | 15.630 |
| Φsp | 20.240 | 18.830 | 12.340 | 14.240 | 13.660 | 17.270 |
| fp | 31.560 | 37.350 | 27.330 | 23.590 | 83.250 | 49.180 |
| f | 35.700 | 20.500 | 35.700 | 44.700 | 35.910 | 16.480 |
| θp | 33.023 | 41.988 | 31.831 | 38.651 | 29.938 | 20.542 |
| hp | 8.859 | 3.426 | 4.295 | 2.513 | 4.293 | 2.049 |
| hˆp | 15.582 | 18.172 | 13.841 | 15.734 | 16.202 | 16.820 |
| ha | 8.636 | 5.292 | 4.419 | 3.198 | 5.419 | 3.119 |
| hˆa | 10.510 | 9.680 | 9.956 | 14.704 | 11.617 | 7.817 |
| tk | 55.250 | 70.480 | 48.820 | 51.090 | 42.800 | 46.230 |
| sk | 13.490 | 13.500 | 13.150 | 13.130 | 15.050 | 11.500 |
| fpp | 23.070 | 16.160 | 23.350 | 19.210 | 17.610 | 11.470 |
| fn | −15.440 | −15.430 | −13.200 | −24.360 | −18.920 | −16.940 |
| Φi | 43.280 | 43.280 | 43.280 | 43.280 | 43.280 | 43.280 |
| (R2 + R1)/(R2 − R1) | −0.750 | −0.579 | −0.953 | −0.488 | −0.600 | 0.741 |
| fr | 52.954 | 35.393 | 55.662 | 83.742 | 83.742 | 83.742 |
| Δnp | 4.900 | 10.100 | 3.280 | 20.610 | 6.610 | 13.560 |
| Δppp | 6.000 | 17.210 | 4.180 | 14.640 | 0.150 | 14.560 |
| Δppn | 0.000 | 6.110 | 0.000 | −0.150 | 0.000 | 0.000 |
| Ssk | 57.319 | 51.428 | 48.439 | 55.403 | 40.335 | 53.160 |
| Lnsk | 41.482 | 34.779 | 33.514 | 44.201 | 31.105 | 33.702 |

TABLE 2

| Conditional expression |  | Numerical example 1 | Numerical example 2 | Numerical example 3 | Numerical example 4 | Numerical example 5 | Numerical example 6 |
|---|---|---|---|---|---|---|---|
| (1) | \|θp\| | 33.023 | 41.988 | 31.831 | 38.651 | 29.938 | 20.542 |
| (2) | \|Δnp/fn\| | 0.317 | 0.655 | 0.248 | 0.846 | 0.349 | 0.800 |
| (3) | sk/f | 0.378 | 0.659 | 0.368 | 0.294 | 0.419 | 0.698 |
| (4) | Φp/Φr | 0.889 | 1.000 | 0.844 | 0.944 | 0.943 | 0.970 |
| (5) | fp/fpp | 1.368 | 2.311 | 1.170 | 1.228 | 4.727 | 4.288 |
| (6) | Φp/Φpp | 1.786 | 2.060 | 1.739 | 1.797 | 1.395 | 2.442 |
| (7) | Φp/Φa | 1.482 | 1.882 | 1.398 | 1.039 | 1.395 | 2.208 |
| (8) | (hˆp/hp)/(hˆa/ha) | 1.445 | 2.900 | 1.430 | 1.362 | 1.761 | 3.275 |
| (9) | Φp/Tk | 0.564 | 0.517 | 0.575 | 0.657 | 0.757 | 0.746 |
| (10) | Tk/f | 1.548 | 3.438 | 1.368 | 1.143 | 1.192 | 2.805 |
| (11) | fp/f | 0.884 | 1.822 | 0.766 | 0.528 | 2.318 | 2.984 |
| (12) | fp/fn | −2.044 | −2.421 | −2.070 | −0.968 | −4.400 | −2.903 |
| (13) | Φp/Φi | 0.720 | 0.842 | 0.649 | 0.775 | 0.749 | 0.797 |
| (14) | \|fr/fn\| | 3.430 | 2.294 | 4.217 | 3.438 | 4.426 | 4.943 |
| (15) | \|Δnp\|/Ssk | 0.085 | 0.196 | 0.068 | 0.372 | 0.164 | 0.255 |
| (16) | Lnsk/Ssk | 0.724 | 0.676 | 0.692 | 0.798 | 0.771 | 0.634 |

TABLE 2-continued

| Conditional expression | Numerical example 1 | Numerical example 2 | Numerical example 3 | Numerical example 4 | Numerical example 5 | Numerical example 6 |
|---|---|---|---|---|---|---|
| (17) \|Δppp\|/Ssk | 0.105 | 0.335 | 0.086 | 0.264 | 0.004 | 0.274 |
| (18) Δppn/Ssk | 0.000 | 0.119 | 0.000 | −0.003 | 0.000 | 0.000 |
| (19) \|(R2 + R1)/(R2 − R1)\| | 0.750 | 0.579 | 0.953 | 0.488 | 0.600 | 0.741 |
| (20) Φp/Φsp | 1.540 | 1.936 | 2.276 | 2.357 | 2.372 | 1.998 |

[Exemplary Embodiment of Imaging Apparatus]

Figure 13:
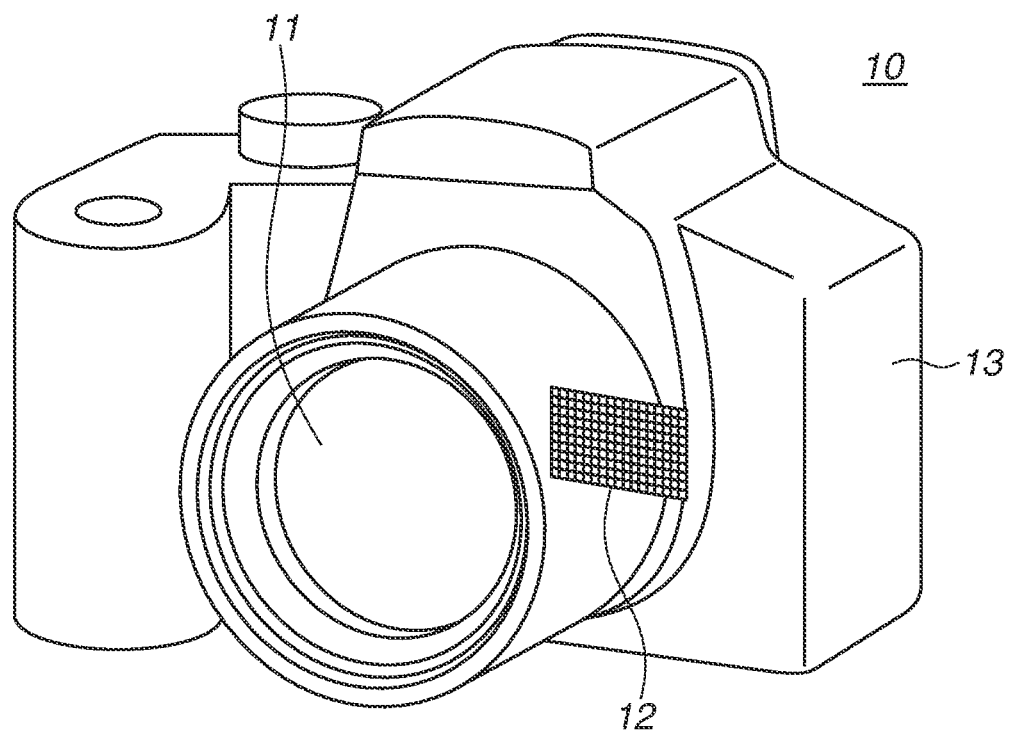
FIG. 13 is a diagram illustrating a configuration of an imaging apparatus.

An exemplary embodiment of an imaging apparatus according to the present invention is described. FIG. 13 is a schematic diagram illustrating an imaging apparatus (digital still camera) 10 according to the present exemplary embodiment. The imaging apparatus 10 includes a camera main body 13, a lens device 11 including an optical system OL similar to that according to any of the first to sixth exemplary embodiments, and a light-receiving element (image sensor) 12 that photoelectrically converts an image formed by the optical system OL. As the light-receiving element 12, an image sensor such as a CCD sensor and a CMOS sensor can be used.

The lens device 11 and the camera main body 13 may be integrated or may be configured to be attachable to and detachable from each other.

The imaging apparatus 10 according to the present exemplary embodiment includes the optical system OL and thereby can inhibit a decrease in marginal illumination.

A lens device according to each of the exemplary embodiments described above can be applied not only to the digital still camera illustrated in FIG. 13 but also to various imaging apparatuses such as a broadcasting camera, a silver halide film camera, and a monitoring camera.

While the exemplary embodiments of the present invention have been described above, the present invention is not limited to these exemplary embodiments but can be combined, modified, and changed in various manners within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-035316, filed Feb. 28, 2018, which is hereby incorporated by reference herein in its entirety.

What is claimed is:

1. An optical system consisting of a front lens group having a positive or negative refractive power, an aperture stop, and a rear lens group having a positive or negative refractive power that are placed in order from an object side to an image side,
   wherein the rear lens group comprises:
      a negative lens Ln having the strongest refractive power in the rear lens group; and
      a positive lens Lp placed on the image side of the negative lens Ln and satisfying a conditional expression:

$20.542 \leq |\theta p| < 90$ (degrees), where θp represents the greater of half opening angles of lens surfaces on the object and image sides of the positive lens Lp, and wherein a lens surface having the greater of half opening angles on the object and image sides of the positive lens Lp is in contact with air,
   wherein a lens La placed adjacent to the positive lens Lp on the object side includes a concave lens surface facing the image side, and
   wherein the optical system satisfies conditional expressions:

$0.317 \leq |\Delta np/fn| \leq 0.800$, $0.25 < sk/f < 1.00$, $0.517 \leq \Phi p/Tk < 1.00$, $1.00 < \Phi p/\Phi a < 4.00$, $1.00 < (h\hat{}p/hp)/(h\hat{}a/ha) < 4.00$, and $0.45 < |(R2+R1)/(R2-R1)| < 1.00$, where Δnp represents a distance on an optical axis between a lens surface on the image side of the negative lens Ln and the lens surface on the object side of the positive lens Lp, and fn represents a focal length of the negative lens Ln,
   where, in a case where the optical system is a single-focus lens, sk represents a back focus of the single-focus lens, f represents a focal length of the single-focus lens, and Tk represents a distance on the optical axis between an exit pupil of the single-focus lens and an image plane,
   where, in a case where the optical system is a zoom lens, sk represents a back focus of the zoom lens at a wide-angle end, f represents a focal length of the zoom lens at the wide-angle end and Tk represents a distance on the optical axis between an exit pupil of the zoom lens at a wide-angle end and the image plane,
   where Φp represents an effective diameter of the lens surface on the image side of the positive lens Lp, Φa represents an effective diameter of a lens surface on the image side of the lens La,
   where, on the lens surface on the image side of the positive lens Lp, h\^p represents a height of a principal ray of an off-axis beam, and hp represents a height of a peripheral ray of an on-axis beam, and,
   where on the lens surface on the image side of the lens La, h\^a represents a height of the principal ray of the off-axis beam, and ha represents a height of the peripheral ray of the on-axis beam,
   where, in a case where the positive lens Lp is a single lens, R1 represents a radius of curvature of the lens surface on the object side of the positive lens Lp, and R2 represents a radius of curvature of the lens surface on the image side of the positive lens Lp, and
   where, in a case where the positive lens Lp is a component of a cemented lens, R1 represents a radius of curvature of a lens surface on an object side of the cemented lens, and R2 represents a radius of curvature of a lens surface on the image side of the cemented lens.

2. The optical system according to claim 1, wherein the optical system satisfies a conditional expression:

$$0.70 < \Phi p/\Phi r \leq 1.00,$$

where $\Phi r$ represents an effective diameter of the lens having the maximum effective diameter among lenses included in the rear lens group.

3. The optical system according to claim 1,
wherein the rear lens group further comprises a positive lens Lpp having the strongest refractive power among positive lenses placed on the object side of the positive lens Lp, and
wherein the optical system satisfies a conditional expression below:

$$1.00 < fp/fpp < 6.00,$$

where fpp represents a focal length of the positive lens Lpp, and fp represents a focal length of the positive lens Lp.

4. The optical system according to claim 1,
wherein the rear lens group further comprises a positive lens Lpp having the strongest refractive power among positive lenses placed on the object side of the positive lens Lp, and
wherein the optical system satisfies a conditional expression:

$$1.00 < \Phi p/\Phi pp < 4.00,$$

where $\Phi pp$ represents an effective diameter of a lens surface on the image side of the positive lens Lpp.

5. The optical system according to claim 1, wherein the optical system satisfies a conditional expression:

$$1.00 < Tk/f < 5.00.$$

6. The optical system according to claim 1, wherein the optical system satisfies a conditional expression:

$$0.30 < fp/f < 5.00,$$

where fp represents a focal length of the positive lens Lp.

7. The optical system according to claim 1, wherein the optical system satisfies a conditional expression:

$$-6.00 < fp/fn < -0.70,$$

where fp represents a focal length of the positive lens Lp.

8. The optical system according to claim 1, wherein the optical system satisfies a conditional expression:

$$0.50 < \Phi p/\Phi i < 1.00,$$

where $\Phi i$ represents a diameter of an image circle of the single-focus lens in a case where the optical system is a single-focus lens, and
$\Phi i$ represents a diameter of an image circle of the zoom lens at a wide-angle end in a case where the optical system is a zoom lens.

9. The optical system according to claim 1, wherein the optical system satisfies a conditional expression:

$$2.00 < |fr/fn| < 10.00,$$

where fr represents a focal length of the rear lens group in a case where the optical system is a single-focus lens, and fr represents a focal length of the rear lens group at a wide-angle end in a case where the optical system is a zoom lens.

10. The optical system according to claim 1, wherein the optical system satisfies a conditional expression:

$$0.00 < |\Delta np|/Ssk < 0.80,$$

where Ssk represents a distance on the optical axis from the aperture stop to an image plane in a case where the optical system is a single-focus lens, and
Ssk represents a distance on the optical axis from the aperture stop to the image plane at a wide-angle end in a case where the optical system is a zoom lens.

11. The optical system according to claim 1, wherein the optical system satisfies a conditional expression:

$$0.50 < Lnsk/Ssk < 1.00,$$

where, in a case where the optical system is a single-focus lens, Lnsk represents a distance on the optical axis from the lens surface on the image side of the negative lens Ln to an image plane, and Ssk represents a distance on the optical axis from the aperture stop to the image plane, and
in a case where the optical system is a zoom lens, Lnsk represents a distance on the optical axis from the lens surface on the image side of the negative lens Ln to the image plane at a wide-angle end, and Ssk represents a distance on the optical axis from the aperture stop to the image plane at the wide-angle end.

12. The optical system according to claim 1,
wherein the rear lens group further comprises a positive lens Lpp having the strongest refractive power among positive lenses placed on the object side of the positive lens Lp, and
wherein the optical system satisfies a conditional expression:

$$0.00 < |\Delta ppp|/Ssk < 1.00,$$

where, in a case where the optical system is a single-focus lens, $\Delta ppp$ represents a distance on the optical axis from a lens surface on the image side of the positive lens Lpp to the lens surface on the object side of the positive lens Lp, and Ssk represents a distance on the optical axis from the aperture stop to an image plane, and
in a case where the optical system is a zoom lens, $\Delta ppp$ represents a distance on the optical axis from the lens surface on the image side of the positive lens Lpp to the lens surface on the object side of the positive lens Lp at a wide-angle end, and Ssk represents a distance on the optical axis from the aperture stop to the image plane at the wide-angle end.

13. The optical system according to claim 1,
wherein the rear lens group further comprises a positive lens Lpp having the strongest refractive power among positive lenses placed on the object side of the positive lens Lp, and
wherein the optical system satisfies a conditional expression:

$$-0.20 < \Delta ppn/Ssk < 0.20,$$

where, in a case where the optical system is a single-focus lens, $\Delta ppn$ represents a distance on the optical axis from a lens surface on the image side of the positive lens Lpp to a lens surface on the object side of the negative lens Ln, and Ssk represents a distance on the optical axis from the aperture stop to an image plane, and
in a case where the optical system is a zoom lens, $\Delta ppn$ represents a distance on the optical axis from the lens surface on the image side of the positive lens Lpp to the lens surface on the object side of the negative lens Ln at a wide-angle end, and Ssk represents a distance on the optical axis from the aperture stop to the image plane at the wide-angle end.

14. The optical system according to claim 1, wherein the positive lens Lp is a single lens and the radius of curvature of the lens surface on the image side of the positive lens Lp is smaller than the radius of curvature of the lens surface on the object side of the positive lens Lp.

15. The optical system according to claim 1, wherein the positive lens Lp is a component of a cemented lens and the radius of curvature of the lens surface on the image side of the cemented lens is smaller than the radius of curvature of the lens surface on the object side of the cemented lens.

16. The optical system according to claim 1,
wherein the optical system is a zoom lens, and
wherein an incidence height of an off-axis beam passing through the positive lens Lp at a wide-angle end is greater than an incidence height of the off-axis beam passing through the positive lens Lp at a telephoto end of the optical system.

17. The optical system according to claim 1,
wherein a plurality of lens units included in the optical system consists of a first lens unit having a positive refractive power and a second lens unit having a negative refractive power that are placed in order from the object side to the image side,
wherein the first lens unit includes a plurality of lenses, and the aperture stop is placed between two of the lenses included in the first lens unit, and
wherein, in focusing from an infinite distance to a closest distance, the first lens unit moves to the object side, whereby a space between the first and second lens units changes.

18. The optical system according to claim 1, wherein a plurality of lens units included in the optical system consists of a first lens unit having a negative refractive power, which is the front lens group, and a second lens unit having a positive refractive power consisting of the aperture stop and the rear lens group, and in focusing from an infinite distance to a closest distance, the rear lens group moves to the object side, whereby a space between the front and rear lens groups changes.

19. The optical system according to claim 1,
wherein a plurality of lens units included in the optical system consists of a first lens unit having a positive refractive power, a second lens unit having a positive refractive power, and a third lens unit having a negative refractive power that are placed in order from the object side to the image side,
wherein the first lens unit includes a plurality of lenses, and the aperture stop is placed between two of the lenses included in the first lens unit, and
wherein, in focusing from an infinite distance to a closest distance, the first and second lens units move to the object side, whereby a space between adjacent lens units changes.

20. The optical system according to claim 1,
wherein a plurality of lens units included in the optical system consists of a first lens unit having a negative refractive power, a second lens unit having a positive refractive power, a third lens unit having a negative refractive power, and a fourth lens unit having a positive refractive power that are placed in order from the object side to the image side,
wherein the second lens unit includes a plurality of lenses, and the aperture stop is placed between two of the lenses included in the second lens unit,
wherein in zooming, a space between adjacent lens units changes, and
wherein in focusing from an infinite distance to a closest distance, the third lens unit moves to the image side.

21. An imaging apparatus comprising:
an optical system; and
an image sensor configured to receive an image formed by the optical system,
wherein the optical system consists of a front lens group having a positive or negative refractive power, an aperture stop, and a rear lens group having a positive or negative refractive power that are placed in order from an object side to an image side,
wherein the rear lens group comprises:
a negative lens Ln having the strongest refractive power in the rear lens group; and
a positive lens Lp placed on the image side of the negative lens Ln and satisfying a conditional expression:

$$20.542 \leq |\theta p| < 90 \text{ (degrees)},$$

where $\theta p$ represents the greater of half opening angles of lens surfaces on the object and image sides of the positive lens Lp, and
wherein a lens surface having the greater of half opening angles on the object and image sides of the positive lens Lp is in contact with air,
wherein a lens La placed adjacent to the positive lens Lp on the object side includes a concave lens surface facing the image side, and
wherein the optical system satisfies conditional expressions:

$$0.317 \leq |\Delta np/fn| \leq 0.800,$$

$$0.25 < sk/f < 1.00,$$

$$0.17 \leq \Phi p/Tk < 1.00,$$

$$1.00 < \Phi p/\Phi a < 4.00,$$

$$1.00 < (h'p/hp)/(h'a/ha) < 4.00, \text{ and}$$

$$0.45 < |(R2+R1)/(R2-R1)| < 1.00,$$

where $\Delta np$ represents a distance on an optical axis between a lens surface on the image side of the negative lens Ln and the lens surface on the object side of the positive lens Lp, and fn represents a focal length of the negative lens Ln,
where, in a case where the optical system is a single-focus lens, sk represents a back focus of the single-focus lens, f represents a focal length of the single-focus lens, and Tk represents a distance on the optical axis between an exit pupil of the single-focus lens and an image plane,
where, in a case where the optical system is a zoom lens, sk represents a back focus of the zoom lens at a wide-angle end, f represents a focal length of the zoom lens at the wide-angle end and Tk represents a distance on the optical axis between an exit pupil of the zoom lens at a wide-angle end and the image plane,
where $\Phi p$ represents an effective diameter of the lens surface on the image side of the positive lens Lp, $\Phi a$ represents an effective diameter of a lens surface on the image side of the lens La,
where, on the lens surface on the image side of the positive lens Lp, $h'p$ represents a height of a principal ray of an off-axis beam, and hp represents a height of a peripheral ray of an on-axis beam, and, where on the lens surface on the image side of the lens La, $\hat{h}a$ represents a height of the principal ray of the off-axis beam, and ha represents a height of the peripheral ray of the on-axis beam, where, in a case where the positive lens Lp is a single lens, R1 represents a radius of curvature of the lens surface on the object side of the positive lens Lp, and R2 represents a radius of curvature of the lens surface on the image side of the positive lens Lp, and where, in a case where the positive lens Lp is a component of a cemented lens, R1 represents a radius of curvature of a lens surface on an object side of the cemented lens, and R2 represents a radius of curvature of a lens surface on the image side of the cemented lens.

\* \* \* \* \*